United States Patent
Lin et al.

(10) Patent No.: US 10,231,259 B2
(45) Date of Patent: Mar. 12, 2019

(54) CONTROL SIGNALING SUPPORTING MULTI-PRIORITY SCHEDULING

(71) Applicant: QUALCOMM Incorporated, San Diego, CA (US)

(72) Inventors: Jamie Menjay Lin, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/948,099

(22) Filed: Nov. 20, 2015

(65) Prior Publication Data
US 2016/0270116 A1    Sep. 15, 2016

Related U.S. Application Data

(60) Provisional application No. 62/133,339, filed on Mar. 14, 2015, provisional application No. 62/133,391, (Continued)

(51) Int. Cl.
H04W 72/12    (2009.01)
H04W 72/14    (2009.01)

(52) U.S. Cl.
CPC ... *H04W 72/1289* (2013.01); *H04W 72/1273* (2013.01); *H04W 72/14* (2013.01); *H04W 72/1247* (2013.01)

(58) Field of Classification Search
None
See application file for complete search history.

(56) References Cited

U.S. PATENT DOCUMENTS

2008/0056118 A1    3/2008  Yu et al.
2009/0110038 A1    4/2009  Montojo et al.
(Continued)

FOREIGN PATENT DOCUMENTS

EP    2015601 A1    1/2009
EP    2515489 A1    10/2012
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650 , Route Des Lucioles ; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".

(Continued)

*Primary Examiner* — Charles C Jiang
*Assistant Examiner* — Saad Khawar
(74) *Attorney, Agent, or Firm* — Loza & Loza, LLP

(57) ABSTRACT

The disclosure relates in some aspects to techniques for use in systems where a plurality of devices with different priority levels share a common set of resources for communication (e.g., downlink transmissions). Certain aspects provide a new indication channel and a procedure to signal scheduling information (e.g., priority information). Such information may serve as an indicator for possible new grants. Such information may additionally serve as an indicator for higher-priority scheduling conflicts or include explicit commands that result from conflicts (e.g., conflicts relating to puncturing of resources allocated for transmissions to lower priority devices).

22 Claims, 17 Drawing Sheets

Related U.S. Application Data filed on Mar. 15, 2015, provisional application No. 62/133,555, filed on Mar. 16, 2015.

(56) References Cited

U.S. PATENT DOCUMENTS

| | | | |
|---|---|---|---|
| 2009/0316811 A1 | 12/2009 | Maeda et al. | |
| 2010/0157924 A1 | 6/2010 | Prasad et al. | |
| 2012/0063390 A1* | 3/2012 | Yu | H04W 28/18 370/328 |
| 2013/0201932 A1* | 8/2013 | Ko | H04L 1/0061 370/329 |
| 2013/0242904 A1 | 9/2013 | Sartori et al. | |
| 2014/0071954 A1* | 3/2014 | Au | H04W 72/0446 370/336 |
| 2014/0200684 A1 | 7/2014 | Mizutani et al. | |
| 2014/0362832 A1* | 12/2014 | Rudolf | H04L 1/1822 370/336 |
| 2015/0208387 A1* | 7/2015 | Awad | H04W 72/042 370/329 |
| 2016/0183293 A1* | 6/2016 | Lei | H04W 72/14 370/329 |
| 2016/0270045 A1 | 9/2016 | Mukkavilli | |
| 2016/0270123 A1* | 9/2016 | Wang | H04W 74/0875 |
| 2017/0013565 A1 | 1/2017 | Pelletier et al. | |

FOREIGN PATENT DOCUMENTS

| | | |
|---|---|---|
| EP | 2755357 A1 | 7/2014 |
| WO | WO-2013112703 A2 | 8/2013 |
| WO | WO-2014040531 A1 | 3/2014 |
| WO | 2014113537 A1 | 7/2014 |

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP Standard; 3GPP TS 36.213, 3rd Generation Partnership Project (3GPP), Mobile Competence Centre ; 650, Route Des Lucioles ; F-06921 Sophia-Antipolis Cedex ; France, vol. RAN WG1, No. V12.4.0, Jan. 7, 2015 (Jan. 7, 2015), pp. 1-225, XP050927573, [retrieved on Jan. 7, 2015].

"3rd Generation Partnership Project; Technical Specification Group Radio Access Network; Evolved Universal Terrestrial Radio Access (E-UTRA); Multiplexing and channel coding (Release 12)", 3GPP Standard; 3GPP TS 36.212, 3rd Generation Partnership Project (3GPP), Mobile Competence Centre ; 650, Route Des Lucioles ; F-06921 Sophia-Antipolis Cedex ; France, vol. RAN WG1, No. V12.3.0, Jan. 3, 2015 (Jan. 3, 2015), pp. 1-89, XP050927387, [retrieved on Jan. 3, 2015] section 5.3.3.1.4A; pp. 71, 72.

International Search Report and Written Opinion—PCT/US2016/018783—ISA/EPO—dated Jun. 1, 2016.

* cited by examiner

CONTROL SIGNALING SUPPORTING MULTI-PRIORITY SCHEDULING

CROSS-REFERENCE TO RELATED APPLICATION(S)

This application claims priority to and the benefit of provisional patent application No. 62/133,339 filed in the U.S. Patent and Trademark Office on Mar. 14, 2015, provisional patent application No. 62/133,391 filed in the U.S. Patent and Trademark Office on Mar. 15, 2015, and provisional patent application No. 62/133,555 filed in the U.S. Patent and Trademark Office on Mar. 16, 2015, the entire content of each of which is incorporated herein by reference.

BACKGROUND

Field of the Disclosure

Aspects of the present disclosure relate generally to wireless communication and more particularly, but not exclusively, to control signaling and/or multi-priority scheduling.

Description of Related Art

Wireless communication networks are widely deployed to provide various communication services such as telephony, video, data, messaging, broadcasts, and so on. Such networks, which are usually multiple access networks, support communication for multiple users by sharing the available network resources.

Within such wireless networks a variety of data services may be provided, including voice, video, and emails. More recently, wireless communication networks are being utilized for an even broader range of services, including mission critical applications and remote control applications such as tele-surgery, where real-time feedback is necessary. As the demand for mobile broadband access continues to increase, research and development continue to advance wireless communication technologies not only to meet the growing demand for mobile broadband access, but to advance and enhance the user experience.

In conventional wireless communication (e.g., Third Generation Partnership Project (3GPP) Long Term Evolution (LTE)), control signaling occurs typically at a subframe periodicity or a certain fixed periodicity. This periodicity may be the smallest regular downlink (DL) scheduling time unit. There are no conflicting bursty activities scheduled at a finer periodicity.

BRIEF SUMMARY OF SOME EXAMPLES

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: determine an interval for communicating a scheduling indicator, wherein the scheduling indicator is one of a plurality of scheduling indicators mapped to a plurality of transmission time interval (TTI) lengths; and communicate the scheduling indicator according to the interval.

Another aspect of the disclosure provides a method for communication including: determining an interval for communicating a scheduling indicator, wherein the scheduling indicator is one of a plurality of scheduling indicators mapped to a plurality of transmission time interval (TTI) lengths; and communicating the scheduling indicator according to the interval.

Another aspect of the disclosure provides an apparatus configured for communication. The apparatus including: means for determining an interval for communicating a scheduling indicator, wherein the scheduling indicator is one of a plurality of scheduling indicators mapped to a plurality of transmission time interval (TTI) lengths; and means for communicating the scheduling indicator according to the interval.

Another aspect of the disclosure provides a non-transitory computer-readable medium storing computer-executable code, including code to: determine an interval for communicating a scheduling indicator, wherein the scheduling indicator is one of a plurality of scheduling indicators mapped to a plurality of transmission time interval (TTI) lengths; and communicate the scheduling indicator according to the interval.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As the scale and types of wireless applications evolve, services at various levels of quality of service (QoS) and/or round-trip-time (RTT) latencies may coexist, such that legacy system designs may run into difficulty supporting these services. More specifically, legacy system designs may run into difficulty supporting user signals at various service needs that are multiplexed over time and over a region of spectral resources in a system. The disclosure relates in some aspects to an effective signaling design that addresses these challenges to ensure in-time actions while maintaining high system efficiency.

In some aspects, the disclosed techniques may be applied, for example, in systems where a plurality of devices with different priority levels share a common set of resources for DL transmissions. Such aspects provide a new indication channel and a procedure to signal scheduling priority information. As will be described in greater detail below, such information may serve as an indicator for possible new DL grants. Such information may additionally serve as an indicator for higher-priority scheduling conflicts (e.g., that result in puncturing of resources allocated for transmissions to lower priority devices).

The disclosure relates in some aspects to a two-tier signaling design to support multi-priority scheduling. First, given the definition of scheduling priority indicators, tier-1 signaling operates through a common channel for detection of the scheduling priority indicators for two purposes: a) detection for a possible new DL grant, and b) confirming if a conflicting higher-priority scheduling update occurs. Second, tier-2 signaling involves detection of dedicated DL grants, where a flexible downlink control information (DCI) design further addresses signaling characteristics of multi-priority scheduling.

The disclosure relates in some aspects to a control channel that may carry control indicators and control information for wireless communication. In some examples, an embedded control channel may carry suitable information for puncturing detection, so that a subordinate entity that is scheduled to receive data may be notified that a scheduled resource is being punctured.

Figure 1:
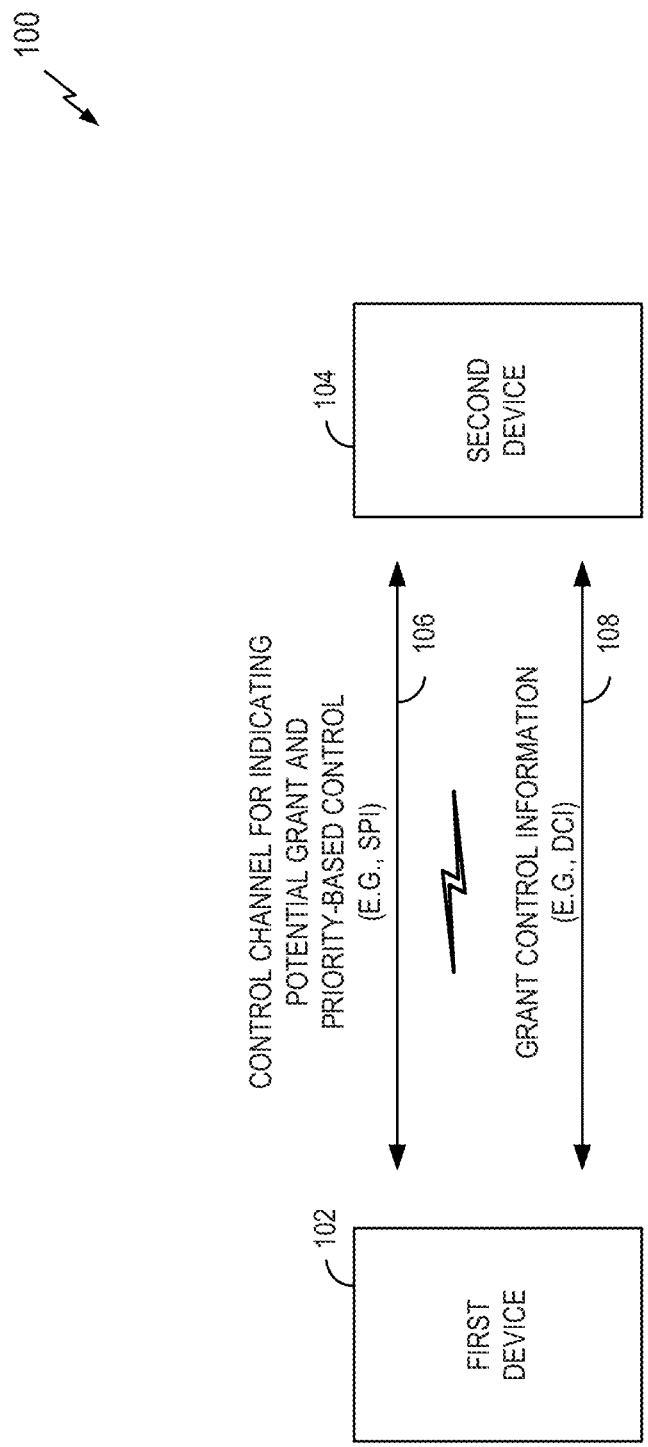
FIG. 1 is a block diagram illustrating an example of control signaling in accordance with some aspects of the disclosure.

FIG. 1 illustrates an example of a communication system 100 that supports control signaling in accordance with the teachings herein. The communication system 100 includes a first device 102 and a second device 104 that may communicate with one another. Typically, the communication system 100 will include other devices. To reduce the complexity of FIG. 1, however, only the first and second devices 102 and 104 are shown. In some implementations, the first device 102 is a scheduling entity (e.g., an access point such as an eNB) and the second device 104 is a subordinate entity (e.g., an access terminal such as a UE) to the scheduling entity. In some implementations, the first device 102 and the second device 104 are peer devices. At some point in time (e.g., when the first device 102 and the second device 104 initially associate with each other), the first device 102 and the second device 104 communicate via a control channel 106 to indicate whether a potential grant may be available (e.g., via an SPI) and to send priority-based control information (e.g., an SPI or an explicit command). For example, the first device 102 may periodically send SPIs to the second device 104 via the control channel 106. Subsequently, the first device 102 and the second device 104 communicate grant control information 108 that indicates whether a grant is available. For example, the first device 102 may send downlink control information (DCI) to the second device 104.

Figure 2:
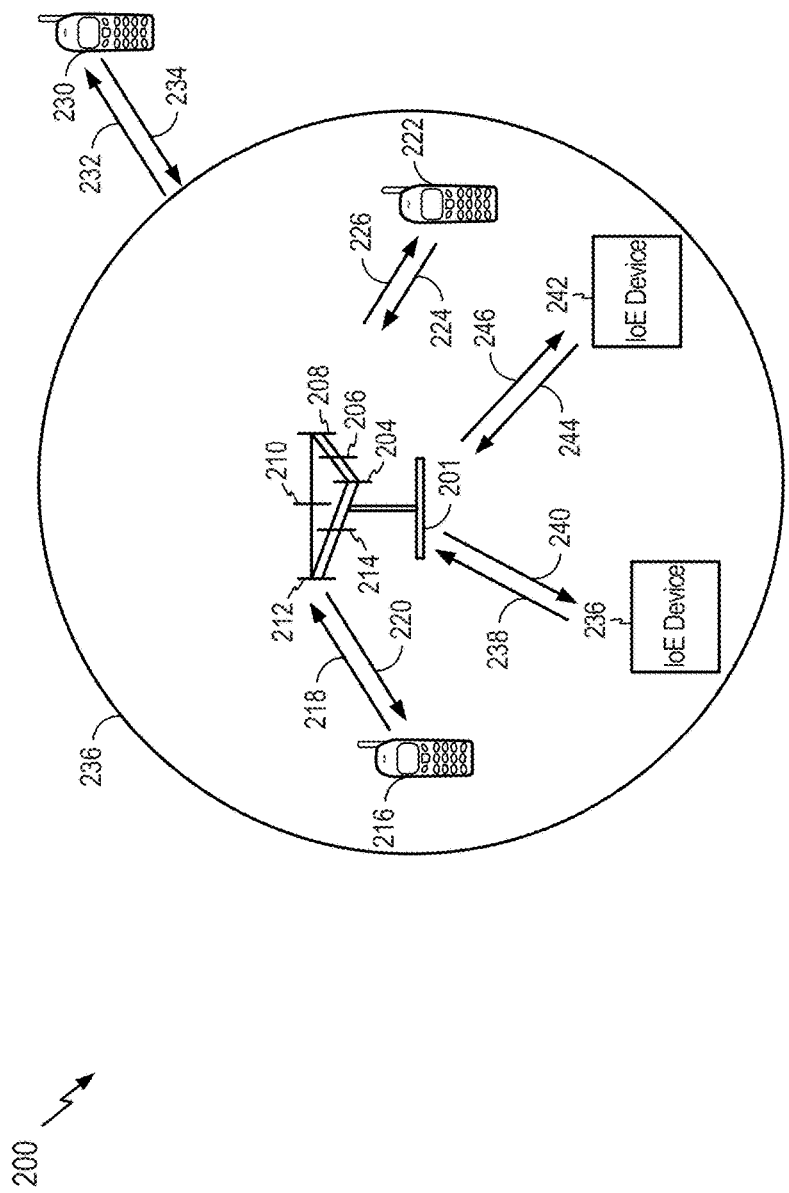
FIG. 2 is a diagram illustrating an example of a multiple access wireless communication system within which aspects of the disclosure may find application.

FIG. 2 illustrates an example communication network 200 in which aspects of the present disclosure may be performed. For example, techniques presented herein may be used to share a common set of resources between various devices having different priority levels.

In the example of FIG. 2, a base station (BS) 201 may include multiple antenna groups, one group including antennas 204 and 206, another group including antennas 208 and 210, and an additional group including antennas 212 and

214. In FIG. 2, two antennas are shown for each antenna group, however, more or fewer antennas may be utilized for each antenna group. A wireless node 216 may be in communication with the antennas 212 and 214, where the antennas 212 and 214 transmit information to the wireless node 216 over a forward link 220 and receive information from the wireless node 216 over a reverse link 218. A wireless node 222 may be in communication with the antennas 204 and 206, where the antennas 204 and 206 transmit information to the wireless node 222 over a forward link 226 and receive information from the wireless node 222 over a reverse link 224. The BS 201 may also be in communication with other wireless nodes, which may be, for example, Internet-of-Everything (IoE) devices. An IoE device 236 may be in communication with one or more other antennas of the BS 201, where the antennas transmit information to the IoE device 236 over a forward link 240 and receive information from the IoE device 236 over a reverse link 238. An IoE device 242 may be in communication with one or more other antennas of the BS 201, where the antennas transmit information to the IoE device 242 over a forward link 246 and receive information from the IoE device 242 over a reverse link 244. In a Frequency Division Duplex (FDD) system, the communication links 218, 220, 224, 226, 238, 240, 244, and 246 may use different frequencies for communication. For example, the forward link 220 may use a different frequency than that used by the reverse link 218, and forward link 240 may use a different frequency than that used by reverse link 238.

The various concepts presented throughout this disclosure may be implemented across a broad variety of telecommunication systems, network architectures, and communication standards. For example, the Third Generation Partnership Project (3GPP) is a standards body that defines several wireless communication standards for networks involving the evolved packet system (EPS), frequently referred to as long-term evolution (LTE) networks.

LTE networks can provide end-to-end latency between a transmitting device and a receiving device on the order of 50 ms, with over-the-air latency for a particular packet being in the range of 10 ms. Currently known LTE functionality provides for a round trip time (RTT) for certain feedback signaling (i.e., hybrid automatic repeat request (HARQ) signaling) of at least about 8 ms, using a transmission time interval (TTI) of 1 ms. In some aspects, a TTI corresponds to a minimum duration of a unit of information that can be decoded. For time division duplex (TDD) LTE configurations, the uplink/downlink configuration has a relatively fixed configuration, which takes around 10 ms to change. In general, LTE provides for a one-size-fits-all approach, with all services and packets relying on these same latency ranges.

Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. These different sets of services may benefit from having multiple latency targets that are drastically different from one another. However, the one-size-fits-all aspects of the LTE network described above can make the multiplexing of traffic with different latency targets very difficult.

The spectrum compatibility of a system that supports such diverse latency targets can be challenging. For example, the time multiplexing of regular traffic and low latency or mission critical (MiCr) traffic could violate the requirements of MiCr packets. Furthermore, reserved frequency domain resources for low latency traffic could limit the peak rate and trunking efficiency. Thus, for next generation networks there is a need for new ways to support the ability to multiplex various types, classes, and categories of traffic and services, including but not limited to traffic having drastically different latency characteristics.

Figure 3:
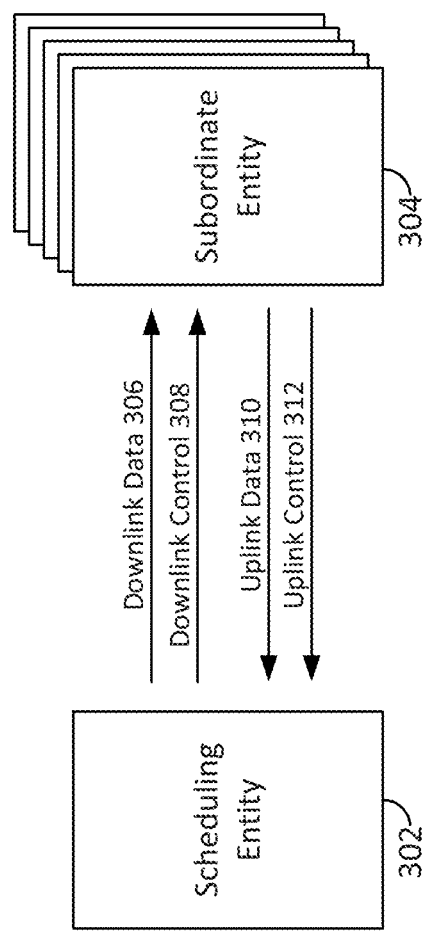
FIG. 3 is a block diagram conceptually illustrating an example of a scheduling entity communicating with one or more subordinate entities in accordance with some aspects of the disclosure.

To illustrate some of the entities or devices described throughout the disclosure, FIG. 3 is a block diagram illustrating an exemplary scheduling entity 302 in wireless communication with a plurality of subordinate entities 304. The scheduling entity 302 transmits downlink data channel(s) 306 and downlink control channel(s) 308, while the subordinate entities transmit uplink data channel(s) 310 and uplink control channel(s) 312. Of course, the channels illustrated in FIG. 3 are not necessarily all of the channels that may be utilized between a scheduling entity 302 and subordinate entities 304, and those of ordinary skill in the art will recognize that other channels may be utilized in addition to those illustrated, such as other data, control, and feedback channels.

As illustrated in FIG. 3, the scheduling entity 302 may broadcast downlink data 306 to one or more subordinate entities 304. In accordance with aspects of the present disclosure, the term downlink may refer to a point-to-multipoint transmission originating at the scheduling entity 302. Broadly, the scheduling entity 302 is a node or device responsible for scheduling traffic in a wireless communication network, including the downlink transmissions and, in some examples, uplink data 310 from one or more subordinate entities 304 to the scheduling entity 302. Another way to describe the scheme may be to use the term broadcast channel multiplexing. A scheduling entity may be, or may reside within, a base station, a network node, a user equipment (UE), an access terminal, or any suitable node in a wireless communication network.

In accordance with aspects of the disclosure, the term uplink may refer to a point-to-point transmission originating at a subordinate entity 304. Broadly, the subordinate entity 304 is a node or device that receives scheduling control information, including but not limited to scheduling grants, synchronization or timing information, or other control information from another entity in the wireless communication network such as the scheduling entity 302. A subordinate entity may be, or may reside within, a base station, a network node, a UE, an access terminal, or any suitable node in a wireless communication network.

Figure 4:
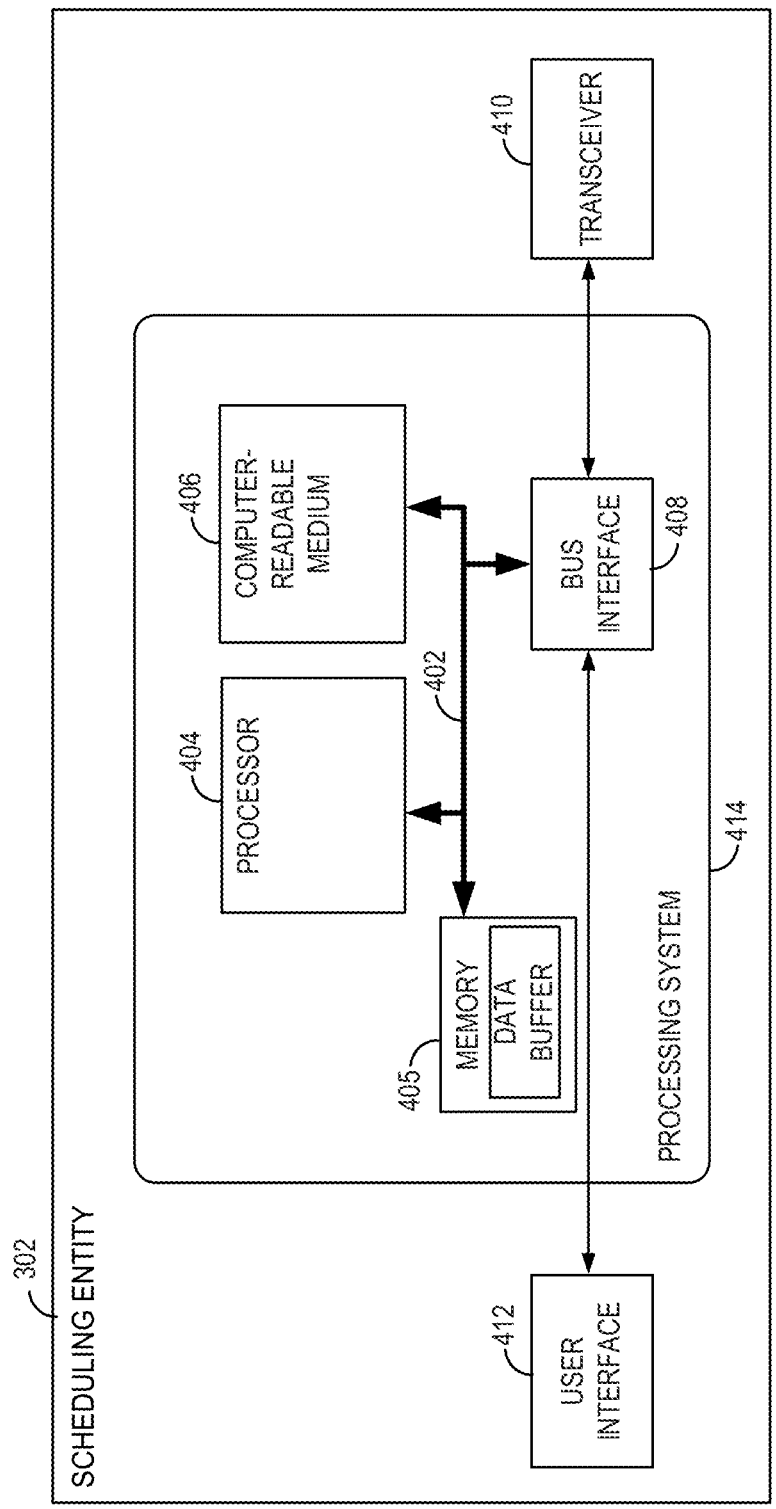
FIG. 4 is a block diagram illustrating an example of a hardware implementation for a scheduling entity employing a processing system in accordance with some aspects of the disclosure.

FIG. 4 is a conceptual diagram illustrating an example of a hardware implementation for a scheduling entity 302 employing a processing system 414 that includes one or more processors 404. In accordance with various aspects of the disclosure, an element, or any portion of an element, or any combination of elements may be implemented with the processing system 414.

In various aspects of the disclosure, the scheduling entity 302 may be any suitable radio transceiver apparatus, and in some examples, may be embodied by a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. Within the present document, a base station may be referred to as a scheduling entity, indicating that the base station provides scheduling information to one or more subordinate entities.

In other examples, the scheduling entity 302 may be embodied by a wireless user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. Within the present document, a UE may be referred to either as a scheduling entity, or a subordinate entity. That is, in various aspects of the present disclosure, a wireless UE may operate as a scheduling entity providing scheduling information to one or more subordinate entities, or may operate as a subordinate entity, operating in accordance with scheduling information provided by a scheduling entity.

In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 may also be used for storing data that is manipulated by the processor 404 when executing software.

Figure 5:
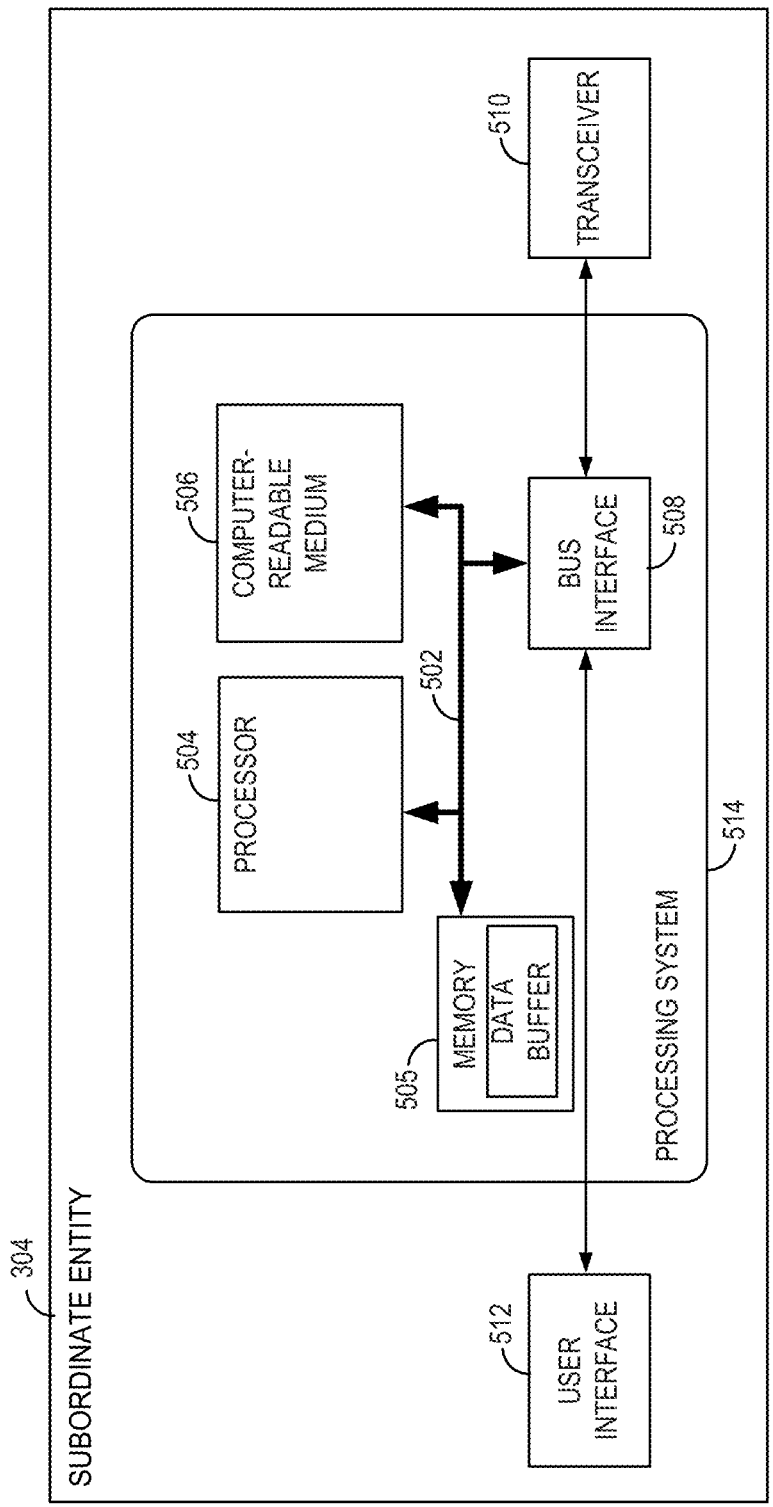
FIG. 5 is a block diagram illustrating an example of a hardware implementation for a subordinate entity employing a processing system in accordance with some aspects of the disclosure.

FIG. 5 is a conceptual diagram illustrating an example of a hardware implementation for an exemplary subordinate entity 304 employing a processing system 514 that includes one or more processors 504. In accordance with various aspects of the disclosure, an element, or any portion of an element, or any combination of elements may be implemented with the processing system 514.

The processing system 514 may be substantially the same as the processing system 414 illustrated in FIG. 4, including a bus interface 508, a bus 502, memory 505, a processor 504, and a computer-readable medium 506. Furthermore, the subordinate entity 304 may include a user interface 512 and a transceiver 510 substantially similar to those described above in FIG. 4. The processor 504, as utilized in a subordinate entity 304, may be used to implement any one or more of the processes described below.

Control Channel Signaling

As noted above, in a system with multi-priority scheduling, transmissions to and from devices with different priority levels may be multiplexed over time and/or over a region of sub-carrier resources. In such cases, a lower-priority user may be subject to scheduling updates by a higher-priority user that might impact its resources (in the form of TTI puncturing).

Aspects of the present disclosure may help address this scenario by providing certain information to mobile devices with different priorities that allow them to detect potential resource allocation collisions and act accordingly. For example, such information may be provided via a new indication channel and a procedure to signal scheduling priority information.

In conventional systems (e.g., LTE), control signaling occurs typically at subframe or certain fixed periodicity, which is the smallest regular DL scheduling time unit and there is no conflicting bursty activities scheduled at a even finer periodicity. In systems designed for multi-priority scheduling, however, services at various levels of priorities (or QoS) and/or RTT latencies may be multiplexed over time and over a region of spectral (namely, sub-carrier) resources in an OFDMA system, with different transmission time intervals (TTIs). As used herein, the term TTI generally refers to the duration of a transmission on a radio link and is generally equal to a periodicity at which a transport block set is transferred by a physical layer (e.g., a TTI is generally related to the size of the data blocks passed from the higher network layers to the radio link layer).

Figure 6:
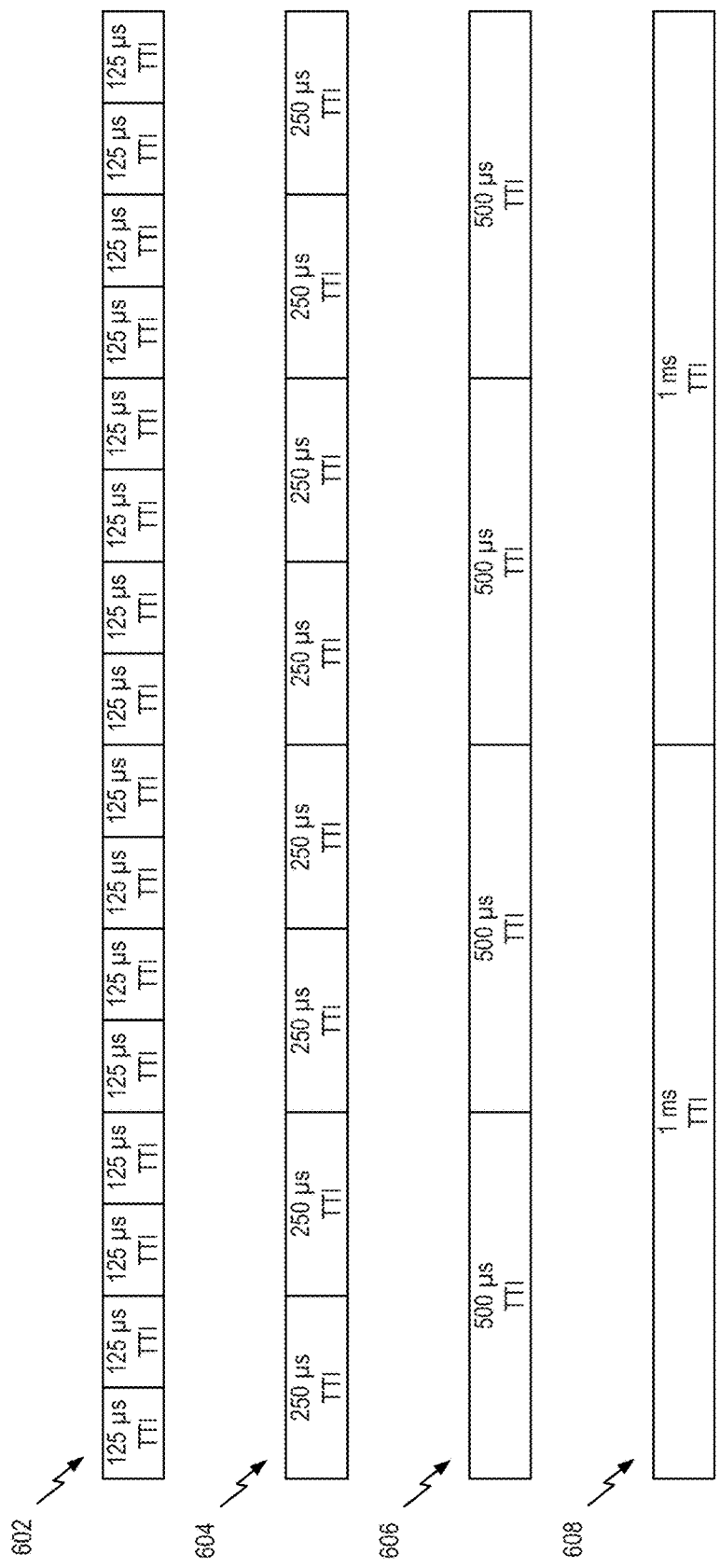
FIG. 6 is a diagram illustrating an example of multiplexed multi-priority scheduling in accordance with some aspects of the disclosure.

Referring to FIG. 6, in some examples, variable transmission time intervals (TTIs) may be utilized to accommodate different levels of priority for different devices, or different applications, or different categories of data to be communicated over the air interface. In one example, a plurality of TTIs may be utilized, with each shorter TTI packet having higher priority than any longer TTI packet. The example of FIG. 6 shows TTIs 602 with a period of 125 is (highest priority), TTIs 604 with a period of 250 μs, TTIs 606 with a period of 500 μs, and TTIs 608 with a period of 1 ms (lowest priority). Here, during ongoing communication with any given TTI, if a shorter TTI, or higher priority packet is to be transmitted (e.g., mission critical, low latency unscheduled data) then this short TTI transmission may puncture the ongoing scheduled data transmission.

A relatively lower-priority user may be subject to bursty yet conflicting scheduling updates (in the form of transmission time interval (TTI) puncturing) by a relatively higher-priority user. For example, a low latency or mission critical user may take priority over a nominal user. As TTI length may become significantly small, legacy signaling for DCI may become unnecessarily excessive, as the channel conditions become less varying.

Figure 7:
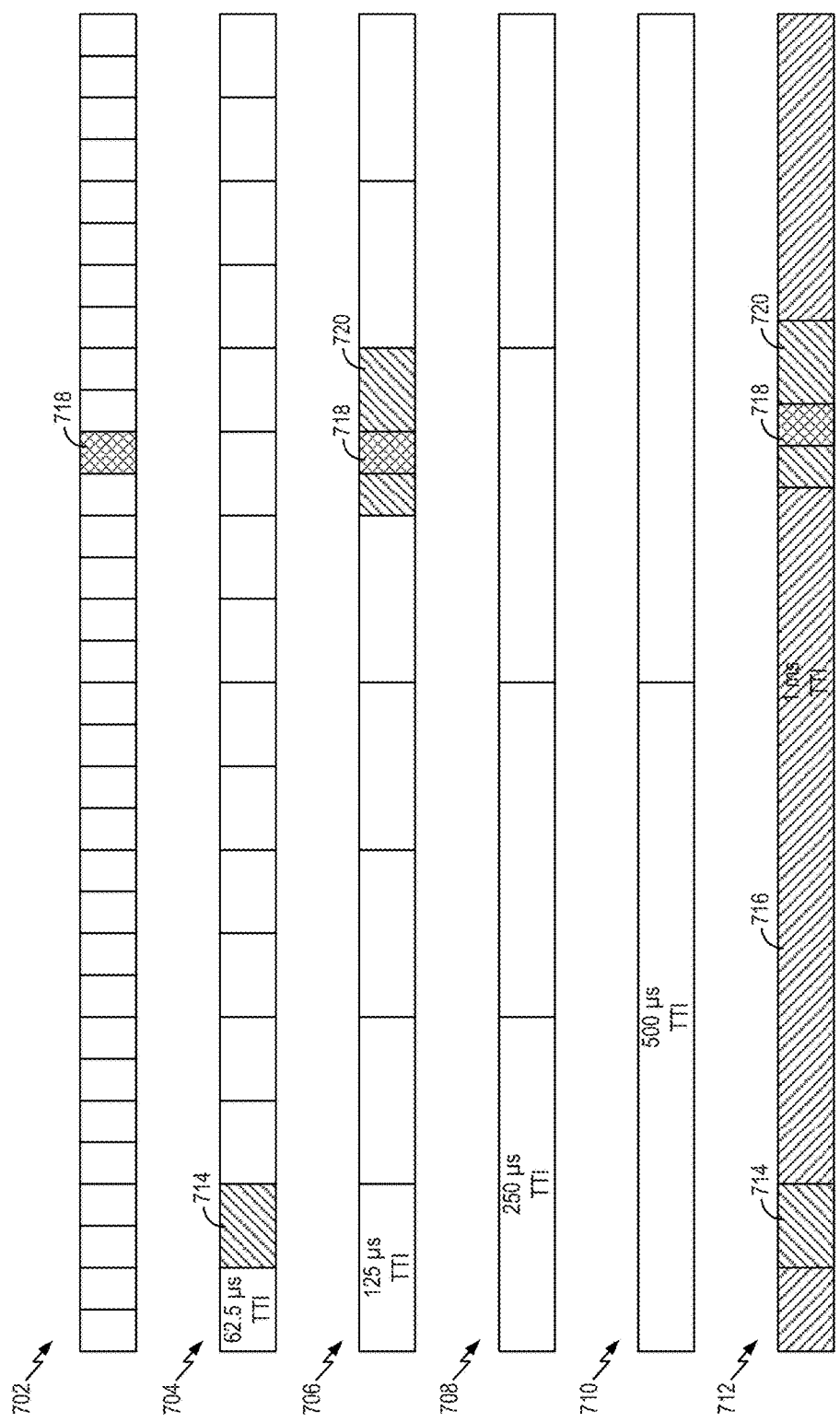
FIG. 7 is a diagram illustrating an example of potential conflicts resulting from multiplexed multi-priority scheduling in accordance with some aspects of the disclosure.

Several examples of collisions (punctures) are illustrated in FIG. 7. Initially, FIG. 7 shows TTIs 702 with a period of 31.25 is (highest priority), TTIs 704 with a period of 62.5 μs, TTIs 706 with a period of 125 μs, TTIs 708 with a period of 250 μs, TTIs 710 with a period of 500 μs, and TTIs 712 with a period of 1 ms (lowest priority). In a first example, a TTI 714 assigned with a grant to a higher priority device (TTIs 704, second row) may result in puncturing to a larger TTI 716 assigned to a device with a lower priority (TTIs 712, bottom row). In a second example, a TTI 718 assigned with a grant to a higher priority device (TTIs 702, top row) may result in puncturing to a larger TTI 720 assigned to a device with a lower priority (TTIs 706, third row). Similarly the TTIs 718 and 720 may, in turn, result in puncturing to the larger TTI 716 assigned to the even lower priority device (TTIs 712, bottom row).

Aspects of the present disclosure, however, may provide an efficient and reliable signaling design to address such challenges by supporting users at both higher and lower priorities in the event of bursty scheduling updates for users' in-time actions.

In various aspects of the disclosure, a control channel may be provided. In some examples, the control channel may be embedded within an allocated data portion of a frame or subframe. For example, a scheduling entity may communicate with one or more subordinate entities utilizing an OFDMA air interface. On this air interface, time-frequency resources may be divided into frames or subframes. In some examples, a subframe may include a control/grant portion and a data portion. Here, the scheduling entity may utilize the control/grant portion to provide scheduling information, indicating scheduled time-frequency resources within the data portion. In some aspects of the disclosure, an embedded control channel may be provided within the data portion, and outside of the control/grant portion of the subframe.

Such a channel may be referred to herein as a Priority Indication Channel (PICH) that may be used to indicate resource allocation to devices with different priorities in a multi-priority scheduling system. The PICH may be sent, for example, by a base station or other network node and may indicate resource assignments for different scheduling priority indices (SPIs). As discussed in more detail below, the PICH may take different forms in different implementations. In some implementations, the PICH is a common PICH (CPICH). In some implementations, the PICH is a directed common PICH (DC-PICH). In some implementations, the PICH is a dedicated PICH (DPICH).

In some aspects, an SPI refers to a priority level assigned to a device, and each SPI generally refer to a scheduling priority of users with that SPI. Thus, each SPI value may correspond to a unique TTI length (e.g., with higher priority SPIs having shorter TTIs and lower priority TTIs having longer TTIs).

Each user may be assigned by the network at least one SPI "SPI_user", each of which corresponds to "TTI_user", an associated TTI for the user. For example, if a user has a single bearer, a single SPI may be assigned. Alternatively, if a user has multiple bearers, the bearers could share one SPI or different SPIs could be assigned to one or more of the bearers (e.g., different sets of bearers may share different SPIs). The network may update the SPI_user as the user's target RTT changes. In addition, a quantity referred to as "TTI_min" or "TTI_smallest" may be signaled by the network to indicate the smallest TTI_user value among all active users (e.g., generally corresponding to the highest priority SPI among such users).

The disclosure relates in some aspects to a tiered DL signaling procedure design to support multi-priority scheduling (MPS). For purposes of illustration, a two tier example is set described below. It should be appreciated, however, that more than two tiers may be used in other implementations.

MPS Tier 1: Signaling for Scheduling Indicators

The network sends scheduling indicators via PICH, a channel to indicate resource block level (RB-level) scheduling priorities for DL data schedules. This channel may be common to all users or individually dedicated to users. A different (e.g., coarser) granularity could be used in other implementations. For example, the scheduling indicators may indicate sub-band level scheduling priorities.

In some implementations of the common channel, the SPIs do not differentiate among individual users. For example, SPIs typically do not include user identifiers.

The scheduling indicator information is transmitted on an OFDM symbol once every T_pich time interval. The T_pich value is commonly signaled by the network.

The network assigns to each user a scheduling indicator (e.g., an "SPI_user") which uniquely corresponds to a TTI length "TTI_user". In some aspects, the SPI_user for a given user quantifies the priority for the user. The network also schedules RBs to the users (e.g., schedules RBs with SPIs).

The network sends the scheduling indications to users once every TTI_min, using one of the following schemes.

A first scheme uses a common (or multi-cast) scheduling priority indicator channel. Here, a common channel carries scheduling priority indicators for all active users.

A second scheme uses a uni-cast scheduling indicator channel. This is a dedicated channel that carries scheduling indicators for a user. The channel may, for example, indicate one of the following: "start/resume", "pause", "stop", to start, pause, or stop reception of the physical downlink shared channel (PDSCH) for the corresponding TTI_min.

Each active user monitors the PICH (in either the first scheme or the second scheme) for a possible grant indication or a possible scheduling conflict.

Regarding the new possible grant for a user, the user may monitor on the common channel once every TTI_user by finding SPI_user for possible DL grants available to the user. This is a "possible" grant because a given SPI could map to multiple users (e.g., that have the same priority level).

Regarding the possible scheduling conflict, a user may detect a possible higher priority scheduling conflict (puncturing) for a TTI_min. For example, the user may pause reception and/or decoding if a conflict is detected (e.g., a higher priority SPI is received). Otherwise, the user may start/resume the reception and/or the decoding. As another example, if the user detects a "stop" indicator, the user may stop reception and/or decoding until the end of TTI_user.

Each active user, when assigned with a DL grant in the current TTI_user, also monitors the SPIs on the PICH once every T_pich by finding any higher-priority SPI (higher than SPI_user) for possible higher-priority scheduling update (e.g., TTI puncturing). Thus, an active user may check the SPIs more often to see if a higher priority SPI (higher priority than the user) is indicated. If there is a higher-priority SPI that conflicts with the user's on-going DL grant, the user pauses decoding for the on-going grant.

MPS Tier 2: Signaling for Dedicated Grant in DCI

Upon successful decoding and detection of SPI_user from the common scheduling priority indicator channel, a possible new DL grant exists. The user further looks for confirmation by decoding and detecting dedicated downlink control information (DCI) for a possible DL grant. Thus, the user may determine whether a potential grant indicated in Tier 1 is a dedicated grant for that particular user by monitoring dedicated channel information.

As discussed in more detail below, a user may derive grant details through physical downlink control channel (PDCCH) detection and decoding for every TTI_user. First, the user may decode DCI on a dedicated channel. Along with the user DCI, the network prepares an SPI user bitmap to further indicate for the user the RB allocation for the DL grant. Second, the user may derive the length of the SPI user bitmap and construct the SPI sequence. The SPI sequence may be constructed based on a known SPI_user from the Common Priority Indication Channel. Third, the user may derive the RB allocation for the grant. Here, the user may extract the SPI user bitmap from the DCI and mask the bitmap with the constructed SPI sequence to derive the final RB allocation for the grant. It is possible for a user to be scheduled for a DL grant for a TTI_user, while being punctured for the beginning of the TTI_min interval.

In some aspects, a given grant (e.g., associated with a particular SPI) may be associated with one or more specific RBs. In some aspects, the signaling may indicate only the specifically granted RBs (e.g., rather than using a bit map corresponding to all of the RBs). In some aspects, one or more sub-bands may be allocated for a given user (e.g., an SPI may be specified per sub-band level, not per RB).

Example Process

Figure 8:
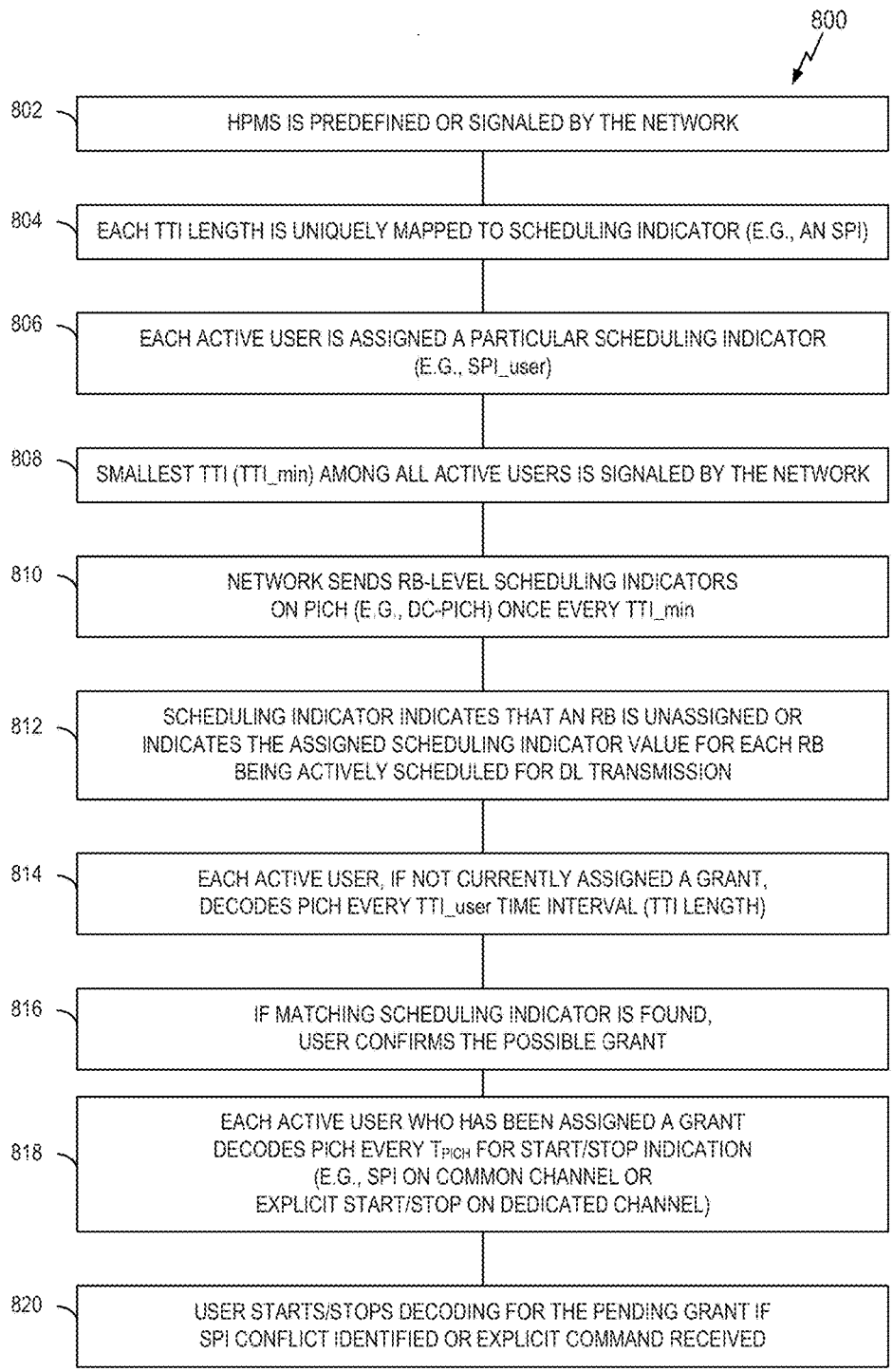
FIG. 8 is a flow diagram illustrating an example of a process for control signaling in accordance with some aspects of the disclosure.

FIG. 8 illustrates a process 800 for supporting the signaling of control information in accordance with some aspects of the disclosure. The process 800 may take place, at least on part, within at least one processing circuit (e.g., the processing circuit 1510 of FIG. 15), which may be located in an access terminal, a base station, some other suitable apparatus, or a combination of these apparatuses. Of course, in various aspects within the scope of the disclosure, the process 800 may be implemented by any suitable apparatus or apparatuses capable of supporting control-related operations.

At block 802, a high priority monitor space (HPMS) is predefined (e.g., by a network operator) or signaled by a network. The HPMS may be a subset of the entire resource block (RB) allocation space of an OFDM symbol. As discussed herein, RBs in the HPMS may be punctured, at the network's decision, with a higher priority scheduling update.

A set of valid TTI lengths is defined for the network to assign from (e.g., based on user priority) in a multiplexed multi-priority scheduling system (MMPSS). In some aspects, a TTI consists of one or more equal-duration OFDM symbols with one CP duration between any two neighboring symbols.

At block 804, each TTI length is uniquely mapped to a scheduling indicator (e.g., an SPI). In addition, an SPI may be defined as identifying an "unassigned" SPI. In some aspects, the smallest scheduling unit for a user may be one resource block (RB). Thus, a corresponding number of bits can be used to represent the per-RB SPIs for all RBs belonging to an OFDM symbol (discussed in more detail below).

At block 806, each active user is assigned a particular scheduling indicator (e.g., SPI_user), which uniquely corresponds to a TTI length (TTI_user). The network may also update the scheduling indicator for a user as it deems necessary.

At block 808, the smallest TTI (TTI_min) among all active users is signaled by the network.

At block 810, the network sends the RB-level scheduling indicators on PICH at an OFDM symbol once every TTI_min ($T_{PICH}$).

At block 812, the scheduling indicator indicates that an RB is unassigned or indicates the assigned scheduling indicator value (e.g., an SPI value) for each RB being actively scheduled (namely, assigned) for downlink (DL) transmission.

At block 814, each active user, if not currently assigned a grant, decodes PICH every TTI_user time interval (TTI length). In addition, the user monitors the entire RB allocation space for possible new DL grants assigned to the user. For example, if an SPI that matches the SPI assigned to the user is received, a new DL grant for the user is possible.

At block 816, if a matching scheduling indicator is found at block 814, a given user may confirm whether the grant is for that user (e.g., by performing the Tier 2 operations discussed above).

At block 818, each active user who has been assigned a grant decodes PICH every TTI_min ($T_{PICH}$) for a start/stop indication. In addition, in some implementations, the user monitors only in the HPMS for possible scheduling updates until the assigned DL grant expires.

For implementations that employ a dedicated channel, the start/stop indication may be an explicit command to the user. For example, the command may instruct the user to start, resume, pause, or stop reception of data for a corresponding TTI_min.

For implementations that employ a common channel, the start/stop indication may be an SPI. If an SPI at a higher priority (than the SPI user) is detected in the HPMS that conflicts with the user's on-going grant, a scheduling update with higher priority puncturing may be assumed. This will result in the user pausing on-going decoding for the grant assigned to the user. Conversely, if the user has previously paused on-going decoding for an assigned grant due to a higher priority scheduling update, and the conflict no longer exists as indicated by the SPIs in the HPMS, this will result in the user resuming reception decoding for the paused assigned grant as long as the grant has not expired.

At block 820, the user starts/stop decoding for the pending grant if an SPI conflict is identified (e.g., for a common channel) or an explicit command is received (e.g., for a dedicated channel) as discussed above.

Flexible DCI

In some implementations, the DCI is classified into 2 subsets, based on the relative rates of change of the information: semi-static information and dynamic information.

Semi-static information includes at least one parameter that varies, for example, once every multiple TTIs. Examples of such information include: {modulation and coding scheme (MCS), RB allocation}. The semi-static information may be excluded in a DCI, as it may not change as frequently as in every TTI.

Dynamic information includes at least one parameter that varies, for example, once every TTI. Examples of such information include: {precoding matrix index (PMI), new data indicator (NDI), redundancy version (RV), HARQ ID}. The dynamic information may be mandatory in every DCI.

A DCI that includes both semi-static information and dynamic information is defined as a normal DCI (N-DCI). A DCI without semi-static information is defined as a light DCI (L-DCI).

There are two options for delivering and decoding the DCI. In option 1 (blind decode), the network decides which type (N-DCI or L-DCI) to transmit, and the UE blindly decodes over both hypotheses for every DCI. In option 2 (coherent decode), the network transmits N-DCI at a subset of the TTIs (by a pre-defined policy, which is a design choice) that may be inferred by the UE, such that both the network and the UE always transmit/decode a DCI coherently. In either option, the network may assume unsuccessful reception of the N-DCI for the UE unless the network receives an HARQ ACK for the DCI-corresponding DL data (or PDSCH).

SPI and RB Examples

Figure 9:
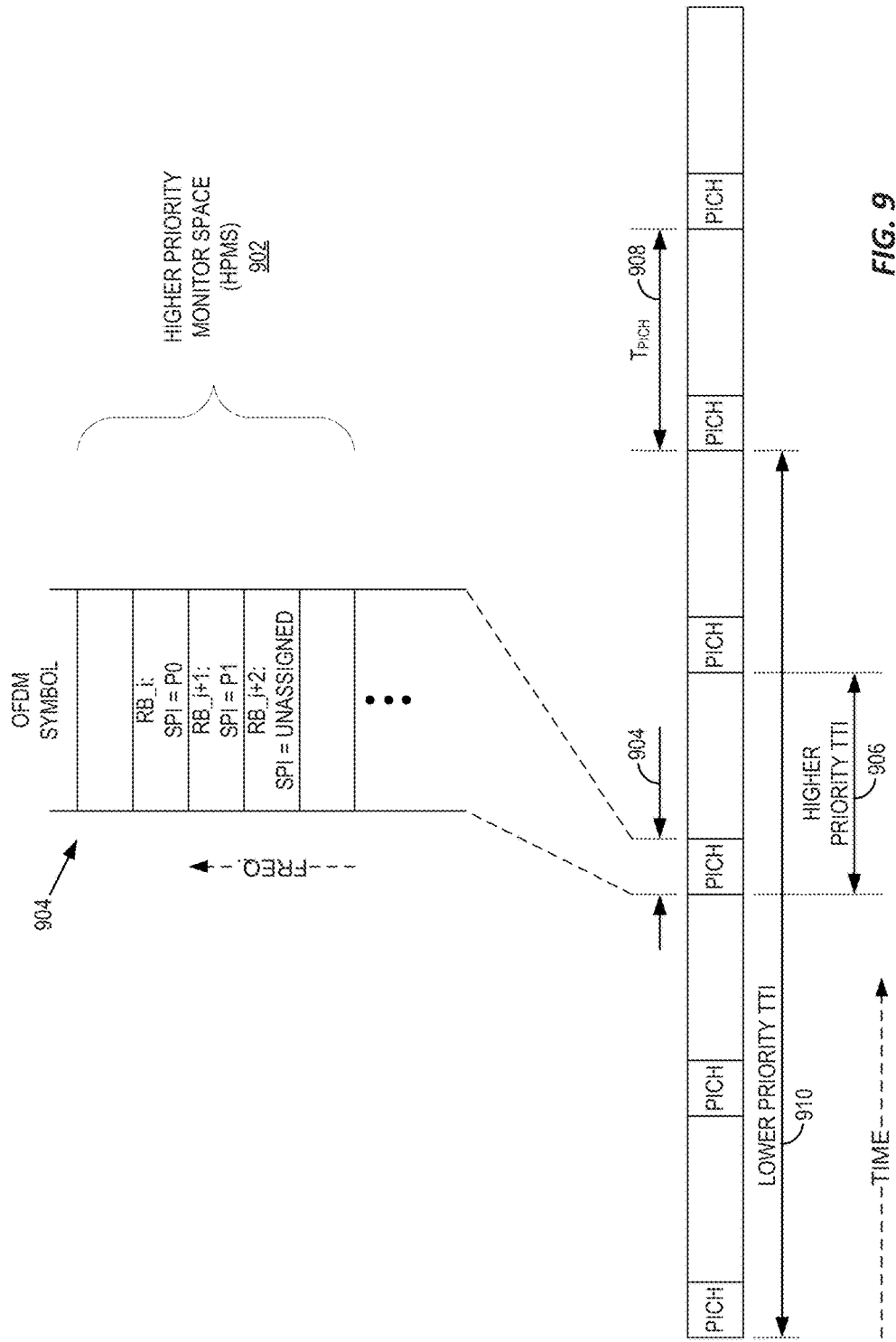
FIG. 9 is a diagram illustrating an example of signaling allocation of resources assigned to devices with different scheduling priority indices (SPIs) in accordance with some aspects of the disclosure.

FIG. 9 illustrates an example of the type of information that may be conveyed in a PICH regarding per-SPI resource allocation. TTIs of various priorities and SPIs may be indicated on the PICH. For example, for RB i, an SPI value of P0 is assigned, for RB i+1, an SPI value of P1 is assigned, and so on. For an RB unassigned to any user, an "unassigned" value may be used as the SPI.

For each RB assigned to a user (for DL grant) in the RB allocation space (e.g., HPMS 902), the network may extract the corresponding SPI_user values and send them on PICH once every TTI_smallest (e.g., in a first OFDM symbol 904 of the higher priority (smallest) TTI 906). FIG. 9 also illustrates an example of a $T_{PICH}$ period 908 and a lower priority (longer) TTI 910.

There may be various types of SPI allocation types in a PICH. For example, there may be an "RB allocation type" (as illustrated in FIG. 9) or a "sub-band allocation" type as discussed below.

Figure 10:
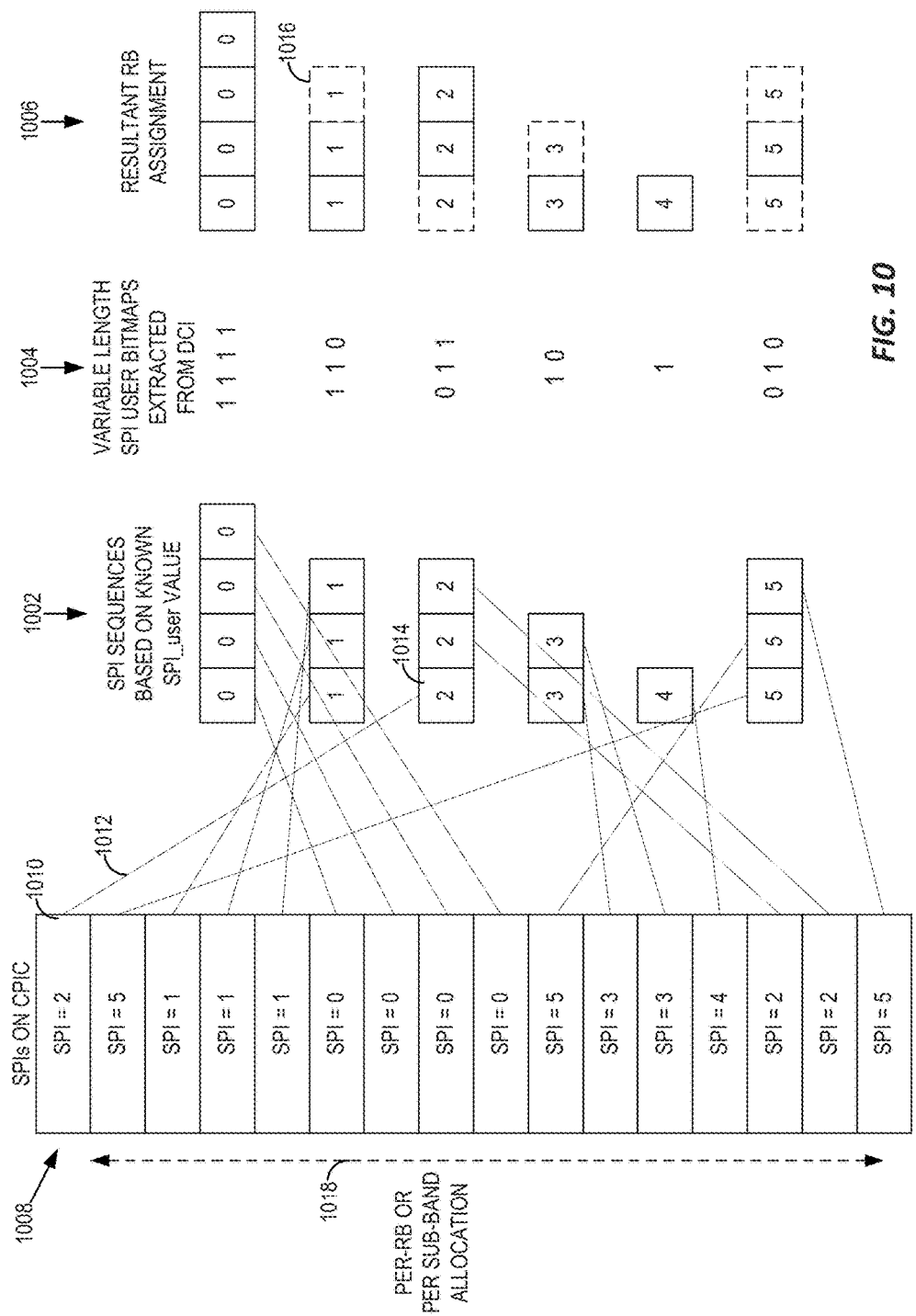
FIG. 10 is a diagram illustrating an example of resource block (RB) assignments based on SPIs in accordance with some aspects of the disclosure.

FIG. 10 illustrates an example derivation of SPI sequences 1002, variable length SPI user bitmaps 1004, and RB assignment 1006. In some aspects, a user at SPI_user priority may determine an "SPI sequence" and the sequence length from the Common Priority Indication Channel (CPIC) 1008 by counting the number of SPIs matching to SPI_user. For example, the SPI 1010 for a first RB or sub-band is mapped 1012 to a first element 1014 of an SPI sequence. By applying the appropriate bitmap 1004 to a given SPI sequence 1002, the resultant RB assignment 1006 can be determined. As indicated by the dashed blocks (e.g., the block 1016), the bitmaps may result in a reduction in the size of the RB assignment.

The constructed SPI sequence along with its length is used for detecting and decoding the user's DCI on a dedicated channel, to finally derive the user's RB allocation for the DL grant. In some cases, a separate variable-length DCI design may support detection and decoding for such a DCI design.

As mentioned above, the SPI allocation (represented by a line 1018) on the CPIC may be per-RB or per sub-band. In the latter case, an RB allocation space may be partitioned into sub-bands and one SPI may be indicated for each sub-band (e.g., with a similar principle with an SPI user bitmap for RB allocation as shown in FIG. 9).

Example Processing Procedures

Figure 11:
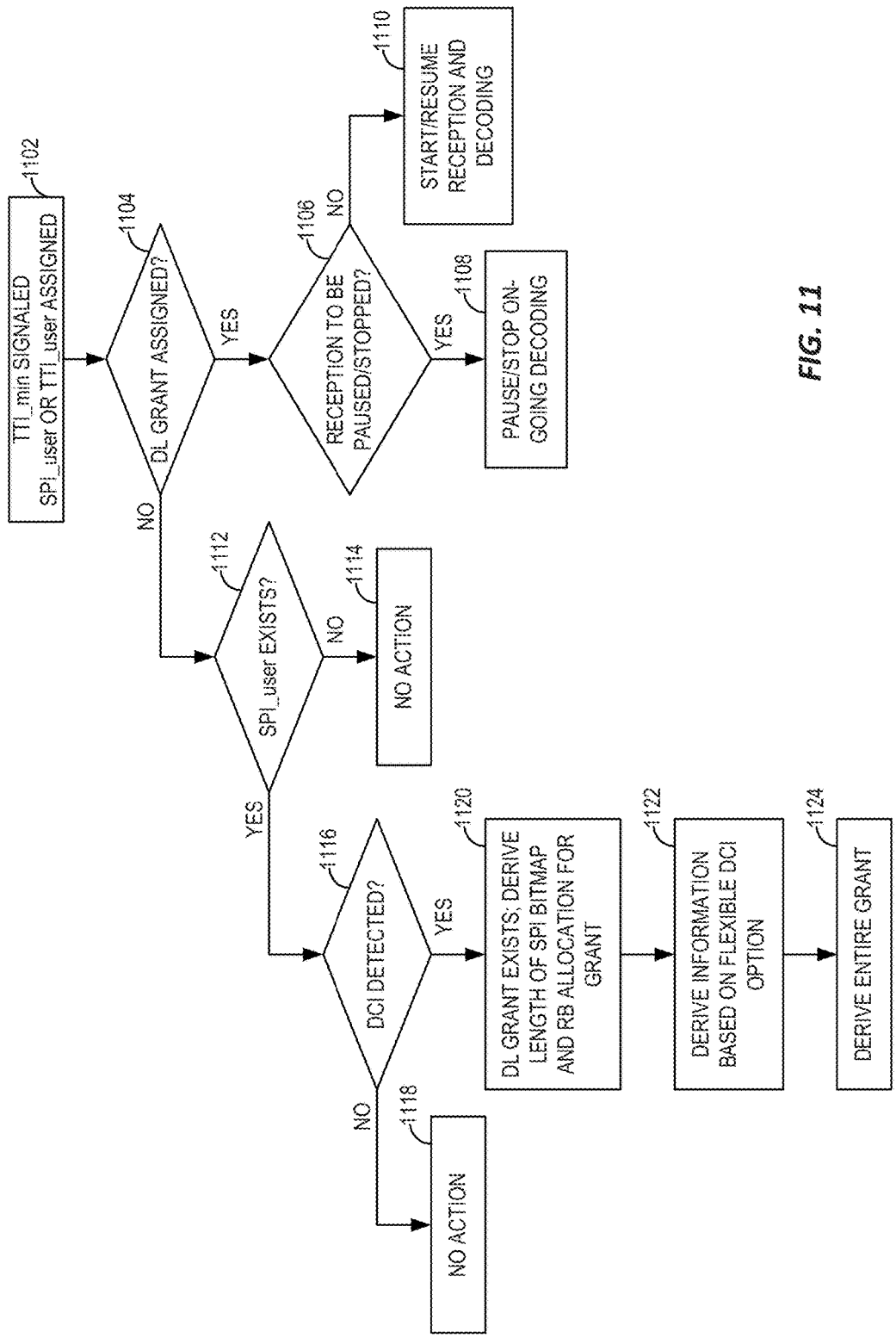
FIG. 11 is a flow diagram illustrating an example of a decision tree for DL grant decoding in accordance with some aspects of the disclosure.

FIG. 11 illustrates an example of a processing procedure for a device (e.g., a UE) to monitor for PICH. As discussed herein, a higher-priority monitor space (HPMS) may be a subset of the entire RB allocation space. A higher-priority scheduling update may be made by the network in (e.g., only in) HPMS. TTI_min is defined (commonly signaled by the network), and SPI_user or TTI_user are assigned to a user by the network (block 1102).

At blocks 1104-1110, each active user who has been assigned with a DL grant in current TTI_user shall additionally decode PICH once in every TTI_min to monitor possible scheduling updates (to detect for a possible collision). If a higher-priority SPI (higher than SPI_user) is detected that conflicts (in terms of RB allocation) with the user's on-going grant, a higher-priority scheduling update (puncturing) exists. The user may take action accordingly. For example, the user may pause on-going data decoding (at least of resources that have been punctured due to an allocation to a higher priority. If the user has paused on-going data decoding and there is no longer any higher-priority scheduling conflicts as indicated by SPIs in the user's assigned RBs, the user may resume reception/decoding for the paused assigned grant as long as the grant has not expired.

Thus, if the user has a DL grant assigned (paused or not) in the current TTI_user (block 1104), operational flow proceeds to block 1106. Here, the user decodes the indication channel once every TTI_min to check if reception needs to be paused/stopped. If not (block 1110), the user starts/resumes reception and decoding. If so (block 1108), the user pauses/stops on-going decoding according to the scheduling indicator.

At blocks 1112-1124, each active user, when not being assigned with a DL grant, may decode CPICH once every TTI_user to monitor for possible new grant. For example, if a matching SPI_user is detected, a new DL grant for the user is possible. If it is determined at block 1104 that a DL grant is not assigned, operational flow proceeds to block 1112. Here, the user decodes the indication channel every TTI_user to detect if SPI_user exists. If not (block 1114), no action is taken since no DL grant was detected. If so, operational flow proceeds to block 1116. In this case, a DL grant possibly exists for the user. Thus, the user attempts to detect DCI on a dedicated channel. If DCI was not detected (block 1118), no action is taken since no DL grant was detected. Otherwise, the DL grant exists. Thus, the user uses SPI_user to derive the length of the SPI user bitmap, and uses the SPI user bitmap in DCI to derive the RB allocation for the grant as discussed above at FIG. 10 (block 1120). A flexible DCI option may be employed as discussed above. Thus, the user may derive semi-static information and extract dynamic information (block 1122). At this point, the entire DL grant is derived and the user is ready to decode the DL data (e.g., from PDSCH).

Figure 12:
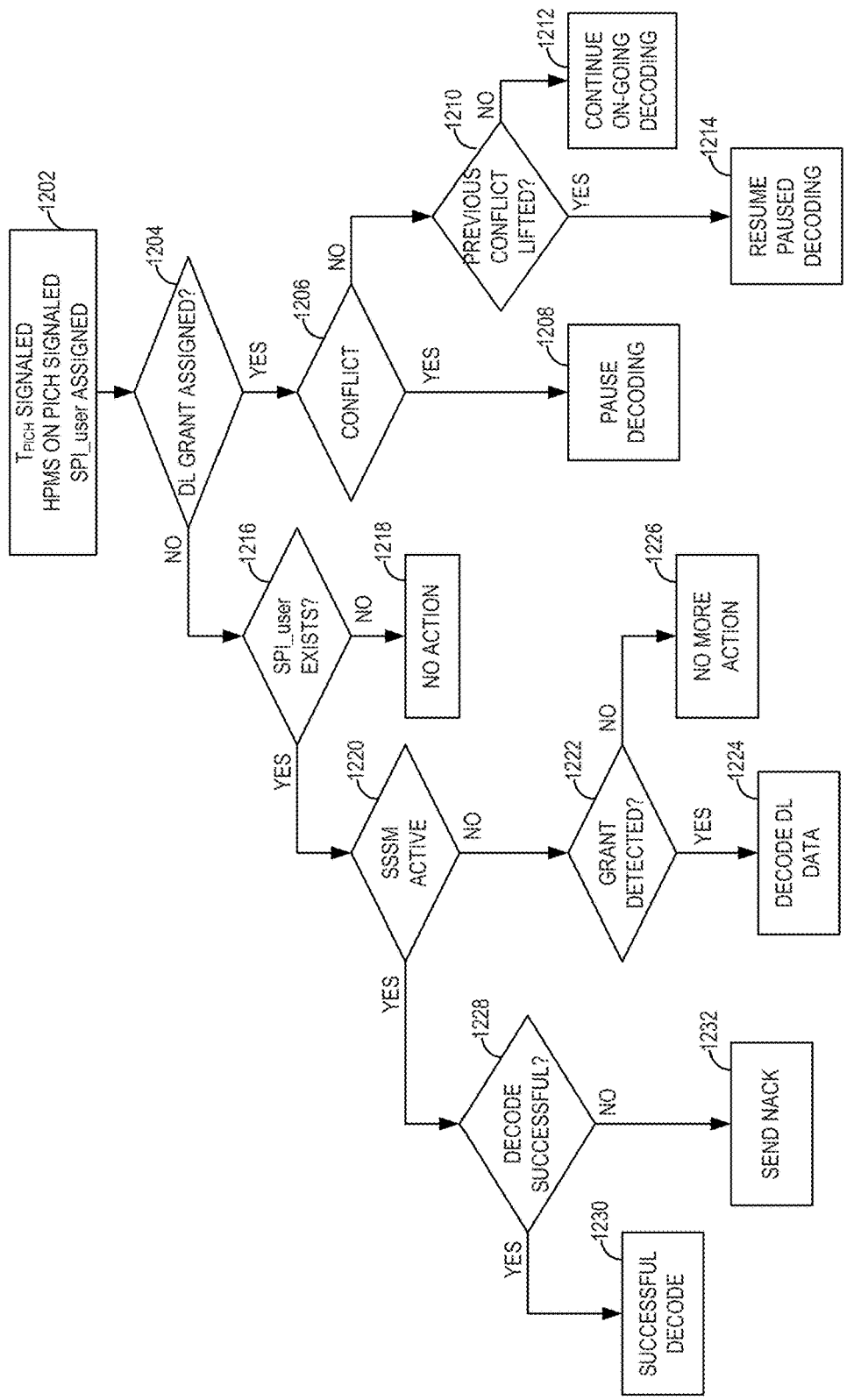
FIG. 12 is a flow diagram illustrating another example of a decision tree for DL grant decoding in accordance with some aspects of the disclosure.

FIG. 12 illustrates another example of a processing procedure for a device (e.g., a UE) to support multi-priority scheduling. This example illustrates the self-scheduling signaling mode (SSSM) and an SPI-specific approach. In SSSM, DCI and data are merged for encoding and transmission.

There are, for example, two ways for the network to signal a DL grant in DCI, based on user-specific conditions. In a first approach, DCI is signaled via PDCCH (SSSM inactive). In a second approach, DCI is signaled via PDSCH (SSSM active).

At block 1202, $T_{PICH}$ is defined (commonly signaled by the network), HPMS is signaled on PICH (commonly signaled by the network), and SPI_user is assigned to each user by the network.

At block 1204, a determination is made as to whether the user has a DL grant assigned (paused or not) in the current TTI. If so, operational flow proceeds to block 1206. Here, the user decodes PICH once every $T_{PICH}$ to check if any higher priority SPI conflicts with the user's on-going DL grant. If there is a conflict (a higher priority scheduling update (TTI puncture) occurs), the user pauses on-going decoding in the current TTI_user (block 1208). Conversely (no conflict at block 1206), if the user has previously paused an on-going DL grant, the user checks to see if the previous SPI conflict has lifted (block 1210). If the conflict has not lifted (block 1212), the user continues with on-going data decoding (i.e., there is no change in the user operations). If the conflict has lifted, the user resumes the paused decoding of the DL grant (block 1214).

If it is determined at block 1204 that a DL grant is not assigned, operational flow proceeds to block 1216. Here, the user decodes the PICH every TTI_user to see if SPI_user exists in HPMS. If not (block 1218), no action is taken. If so, operational flow proceeds to block 1220. The user then determines whether SSSM is active. If not (block 1222), the user determines whether a grant is detected in DCI (e.g., via PDCCH). If a grant was not detected (block 1226), no action is taken since no DL grant was detected. Otherwise, a new DL grant is found (block 1224), and the user decodes the DL data (e.g., on PDSCH).

If SSSM is active at block 1220, operational flow proceeds to block 1228. The user decodes the received data (e.g., PDSCH) on the assumption of unchanged semi-static information in DCI. Thus, the data decoding is either successful (block 1230) or not (block 1232). If the data decoding was not successful (e.g., PDSCH decode fails), the user may send a NACK on the uplink (UL).

Potential Effect and Benefits

Examples of potential effect and/or benefits of a tiered control signaling design follow. In Tier 1 control signaling with common scheduling priority indicators, a user decodes the common scheduling priority indicators for two purposes. The first purpose is to check if a possible new DL grant is available for the user (e.g., check once every TTI_user). The second purpose is to confirm if a conflicting higher-priority schedule update occurs while the user has an on-going DL grant (e.g., confirm once every $T_{PICH}$ when a DL grant is assigned for current TTI_user).

In Tier 2 control signaling with dedicated DL grants, once tier 1 signaling confirms a possible new DL grant is available, the user further decodes DCI to confirm such new DL grant. Furthermore, if SSSM (self-scheduling signaling mode) is active, the DCI is signaled along with DL data (i.e., "merged" for decoding and transmission, which further reduces processing overhead at the receiver). Otherwise, if SSSM is not active, legacy signaling (i.e., separation between DCI and DL data) is used Examples of potential effect and/or benefits of a flexible DCI design follow. Two types of DCI, N-DCI and L-DCI, are defined, which enables flexibility in including both semi-static information and dynamic information or including only dynamic information. The exact choice of parameters to be included in N-DCI and L-DCI is by design choice. Two options (e.g., at the choice of the designer) for signaling/decoding have been described. In either option, unnecessarily excessive signaling in a subset of the DCI may be eliminated, which enables further saving in the multi-priority scheduling system.

In contrast, conventional wireless communication (e.g., LTE) employ regular PDCCH schedules and configure data decoding in every single DCI, which may be too heavy (e.g., too processing intensive) for shorter TTI lengths. SPS (semi-persistent scheduling) is the opposite, which involves no PDCCH between configurations. In addition, regular PDCCH and SPS are not specifically designed for multi-priority scheduling with dynamic updates. For example, RB allocation typically represent 30~60% of the entire DCI. In LTE PDCCH format 1/1C for 20 MHz, RB allocation occupies 60% of DCI.

Directional Control Channel

In a wireless system equipped with a larger amount of transmit antennas (e.g., a massive multiple-input multiple-output (MIMO) system), a relatively finer spatial resolution in signal transmission (namely, beam-forming) may be achieved. Typically, such superior transmission capability is used for dedicated (or UE-specific) signaling such as a UE-specific reference signal (UERS) and a dedicated control signal (e.g., LTE PDCCH)

To additionally take advantage of such superior transmission capability in signaling common to multiple or all users, the disclosure relates in some aspects to the use of a directional common channel (DCC, where the term "common" refers in some aspects to a common payload intended for multiple users), to utilize the available capability of a larger amount of transmit antennas through beam-forming transmission to individual users to beam-form a common payload to multiple users.

For each individual users to properly receive and decode signals on such a type of DCC in an OFDMA system, a reference signal of a suitably designed sub-carrier pattern may be transmitted along with the same multiple-antenna system. In this way, users may receive both the DCC payload signal and the reference signal through identical antennas and the MIMO propagation channel, and use such a reference signal as a source for estimation (e.g., channel estimation and interference estimation) to assist detecting and decoding the DCC payload signal.

Several instances of common physical channels may be suitable for this proposed type of DCC technique. Such common channels include a common broadcast channel, a pilot channel, and a common indicator channel.

Thus, the PICH may be sent directionally (e.g., with beam-forming) This may involve reusing a same set of sub-carrier resources, and uni-cast transmission of the channelized common payload through directional signaling by properly using spatial characteristics of individual users. To aid reception and decoding for each intended user, a UE-specific reference signal may be transmitted along with the common payload signal, by properly using spatial characteristics of individual users (same characteristics used as those used for the common payload signal).

Examples of benefits that may be achieved through the use of a directional, beam-forming common channel follow.

Spectral efficiency, power efficiency, and link performance: Legacy (broadcast/non-direction/non-beam-forming) common channels typically can use only a lower modulation order (e.g., QPSK in LTE PDCCH) for transmission due to link-budget limitations (such as for cell edge users). DCC, however, breaks those limitations and enables spatial processing at the transmitter for beam-forming toward individual users and thus a higher modulation order may be used.

Sub-carrier resource efficiency: Since the same payload is targeted for multiple users (receivers) as a common channel, post-modulation frequency-domain constellation symbols targeted for multiple receiving users may be weighted and linearly superposed over same (re-used) set of sub-carriers (due to a common payload) at the antenna system during transmission (Tx) processing.

Examples of benefits that may be achieved through the use of a Directional Common Priority Indication Channel (DC-PICH) follow.

Sub-carrier resource efficiency—O(N) vs. O(log N): To deliver DL grant (scheduling) information to multiple users, instead of relying completely in UE dedicated signaling (e.g., LTE PDCCH), DC-PICH uses common scheduling priority indicators to provide "top-level" indications to all active users for needed actions. Specifically, in LTE PDCCH, one copy of RBG bitmap information is transmitted to each active user with the grant assignment, while in DC-PICH, only the common SPIs are transmitted, resulting in significant savings in sub-carrier resources. A complexity-order comparison follows.

LTE PDCCH (alloc type 0): Assume an RBG table size is "T" bits. For "N" active users, a total of "T*N" bits are needed against sub-carrier resources to transmit.

DC-PDCH with another dedicated indicator: Assume "N" active users are partitioned into "M=N" priority levels. For the same amount of grant schedule information for all "N" active users, only "T*log 2(N)" bits are required against sub-carrier resources to deliver the scheduling information to all "N" active users.

Link performance efficiency: Conventionally, DL grant schedule information is transmitted through non-directional transmission (e.g., LTE PDCCH), which is not as spectrally and power efficient, and is not as link performance efficient, when compared with beam-forming DC-PICH (e.g., in combination with another dedicated channel as described herein).

Example Processes

Figure 13:
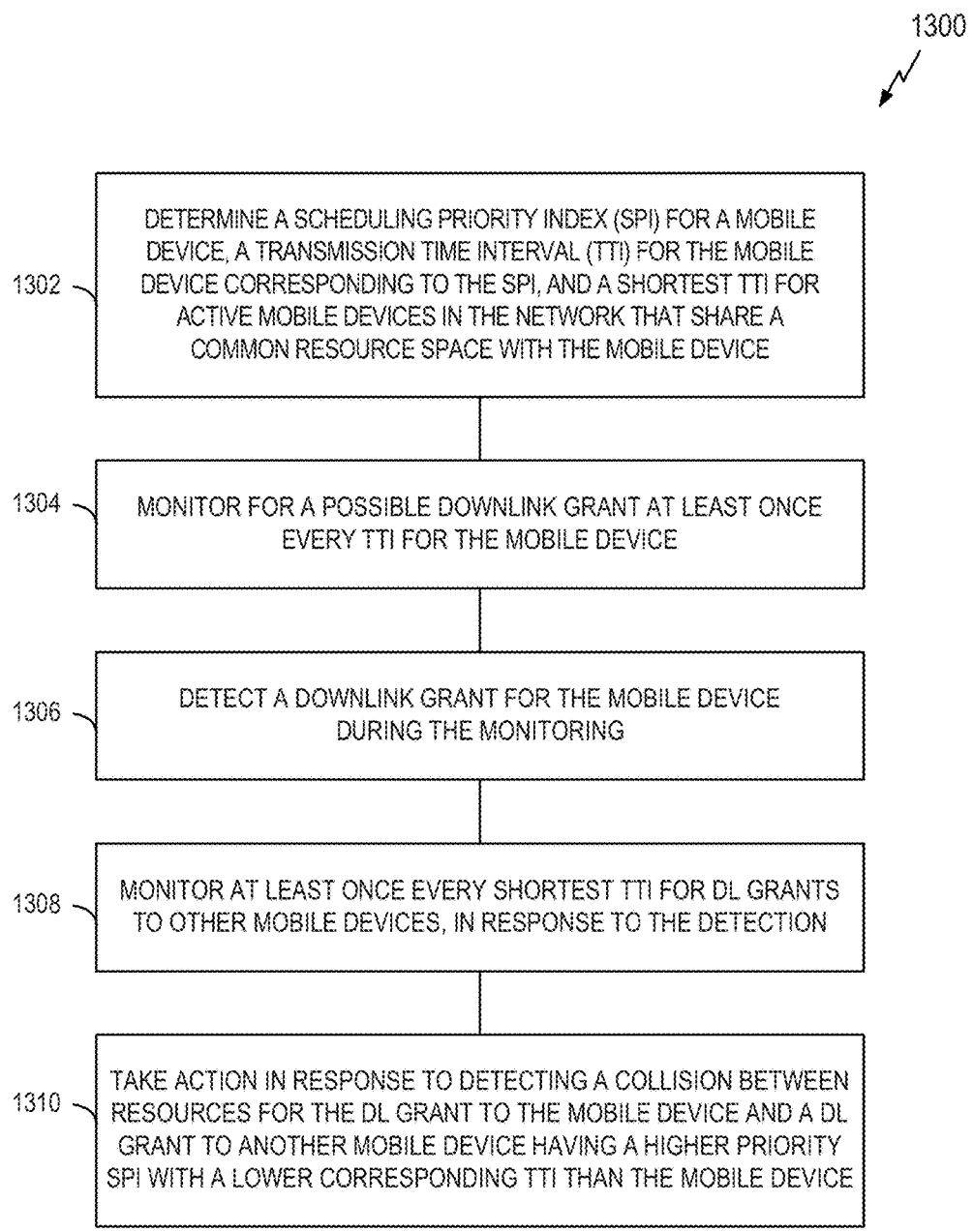
FIG. 13 is a flow diagram illustrating an example of operations for detecting potential conflicts in SPI-based resource allocation in accordance with some aspects of the disclosure.
Figure 14:
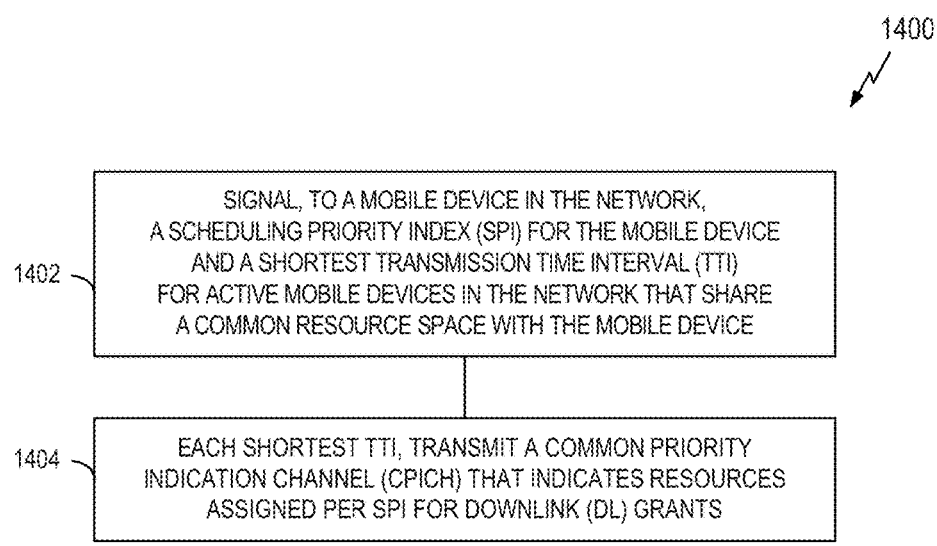
FIG. 14 is a flow diagram illustrating an example of operations for signaling SPI information and resource allocation in accordance with some aspects of the disclosure.

While a network-side device, such as a base station, may transmit a CPICH each smallest TTI, a UE may monitor for a CPICH to detect potential grants and possible collisions. FIGS. 13 and 14 illustrate example operations corresponding to transmitting and monitoring for a CPICH.

FIG. 13 illustrates a process 1300 for monitoring for collisions by a mobile device (e.g., a UE), based on SPI information and resource allocation, in accordance with some aspects of the disclosure. The process 1300 may take place within a processing circuit (e.g., the processing circuit 1510 of FIG. 15), which may be located in an access terminal, a base station, or some other suitable apparatus. Of course, in various aspects within the scope of the disclosure, the process 1300 may be implemented by any suitable apparatus capable of supporting control-related operations.

The process 1300 begins, at block 1302, by determining a scheduling priority index (SPI) for the mobile device, a transmission time interval (TTI) for the mobile device corresponding to the SPI, and a shortest TTI for active mobile devices in the network that share a common resource space with the mobile device. In some aspects, this determination may involve or may be the result of receiving signaling indicating the SPI for the mobile device and the shortest TTI.

At block 1304, the mobile device monitors for a possible downlink grant at least once every TTI for the mobile device. In some aspects, the monitoring for a possible downlink grant at least once every TTI for the mobile device may involve monitoring for a common priority indication channel (CPICH) that indicates resources assigned per SPI. In some aspects, the CPICH may indicate resources with a granularity of an integer value of one or more resource blocks (RBs). In some aspects, the CPICH may indicate resources with a granularity of an integer value of sub-bands. In some aspects, the CPICH may be transmitted in a first symbol of every shortest TTI.

At block 1306, the mobile device detects a downlink grant for the mobile device during the monitoring. In some aspects, the detecting a downlink grant for the mobile device may involve detecting a CPICH with a resource assignment for an SPI matching an SPI of the mobile device.

At block 1308, the mobile device monitors at least once every shortest TTI for DL grants to other mobile devices, in response to the detection at block 1306. In some aspects, the monitoring at least once every shortest TTI for DL grants to other mobile devices may involve monitoring for a common priority indication channel (CPICH) that indicates resources assigned per SPI.

At block 1310, the mobile device takes action in response to detecting a collision between resources for the DL grant to the mobile device and a DL grant to another mobile having a higher priority SPI with a lower corresponding TTI than the mobile device. In some aspects, taking action involves pausing on-going data decoding for the DL grant when reaching colliding resources. In this case, data decoding may be resumed for remaining non-colliding resources.

FIG. 14 illustrates a process 1400 for signaling SPI information and resource allocation by a network node (e.g., a base station) in accordance with some aspects of the disclosure. The process 1400 may take place within a processing circuit (e.g., the processing circuit 1510 of FIG. 15), which may be located in an access terminal, a base station, or some other suitable apparatus. Of course, in various aspects within the scope of the disclosure, the process 1400 may be implemented by any suitable apparatus capable of supporting control-related operations.

The process 1400 begins, at block 1402, by signaling, to a mobile device in the network, a scheduling priority index (SPI) for the mobile device and a shortest transmission time interval (TTI) for active mobile devices in the network that share a common resource space with the mobile device.

At block 1404, the network node transmits, each shortest TTI, a common priority indication channel (CPICH) that indicates resources assigned per SPI for downlink (DL) grants. In some aspects, the CPICH may indicate resources with a granularity of an integer value of one or more resource blocks (RBs). In some aspects, the CPICH may indicate resources with a granularity of an integer value of sub-bands. In some aspects, the CPICH may be transmitted in a first symbol of every shortest TTI. In some aspects, the CPICH may be sent via at least one of: a beam-formed transmission or a directional transmission. In some aspects, the CPICH may be sent using spatial characteristics of individual users. In some aspects, the CPICH may be sent with reference signals specific to the individual users.

Example Apparatus

Figure 15:
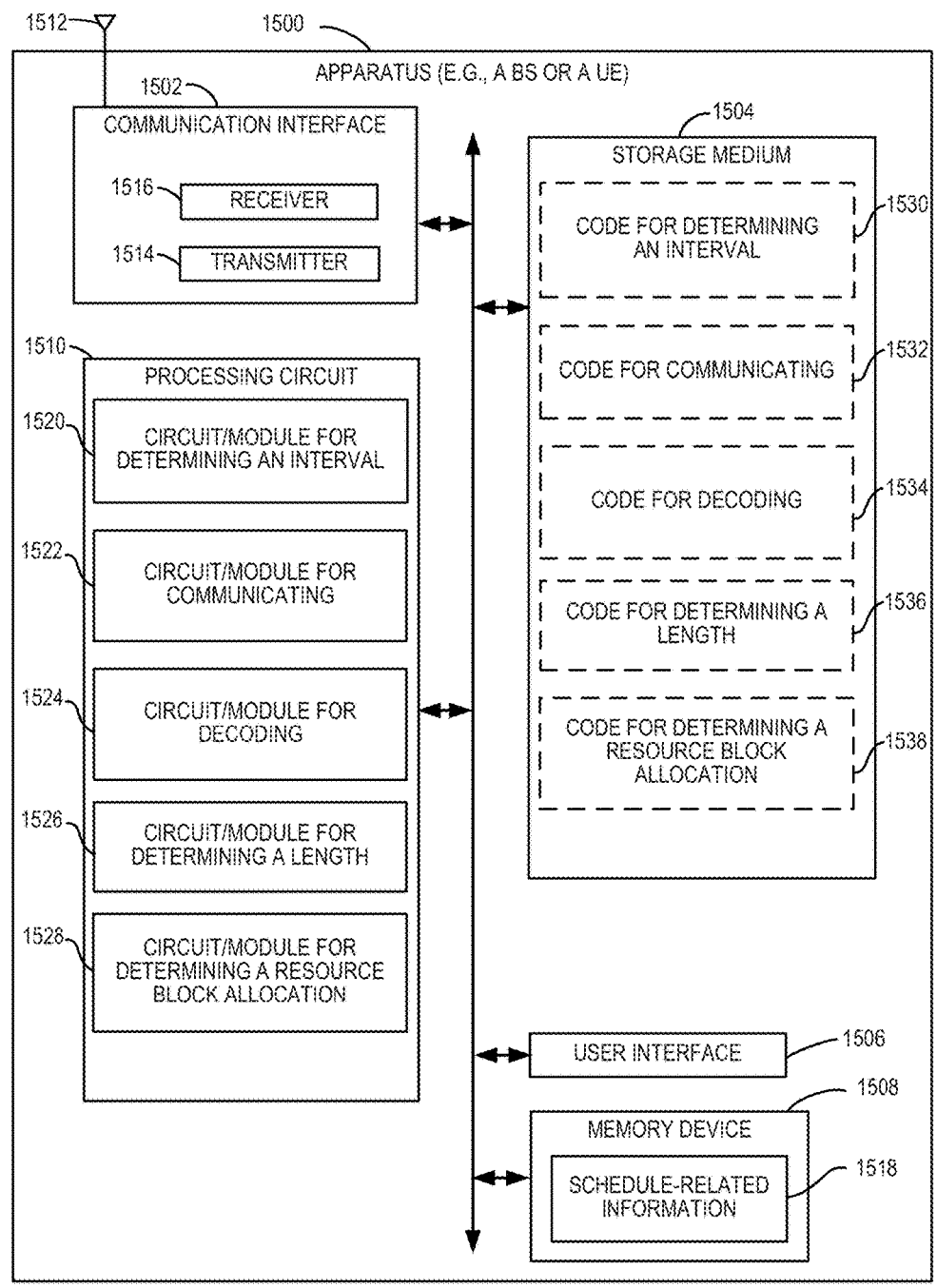
FIG. 15 illustrates a block diagram of an example hardware implementation for an apparatus (e.g., an electronic device) that can support control signaling in accordance with some aspects of the disclosure.

FIG. 15 is an illustration of an apparatus 1500 that may support scheduling according to one or more aspects of the disclosure. The apparatus 1500 could embody or be implemented within a mobile device, an access point, or some other type of device that supports wireless communication. In various implementations, the apparatus 1500 could embody or be implemented within an access terminal (e.g., a UE), a base station (BS), or some other type of device. In various implementations, the apparatus 1500 could embody or be implemented within a mobile phone, a smart phone, a tablet, a portable computer, a server, a personal computer, a sensor, an entertainment device, a medical device, or any other electronic device having circuitry. The apparatus 1500 includes a communication interface (e.g., at least one transceiver) 1502, a storage medium 1504, a user interface 1506, a memory device 1508, and a processing circuit 1510.

These components can be coupled to and/or placed in electrical communication with one another via a signaling bus or other suitable component, represented generally by the connection lines in FIG. 15. The signaling bus may include any number of interconnecting buses and bridges depending on the specific application of the processing circuit 1510 and the overall design constraints. The signaling bus links together various circuits such that each of the communication interface 1502, the storage medium 1504, the user interface 1506, and the memory device 1508 are coupled to and/or in electrical communication with the processing circuit 1510. The signaling bus may also link various other circuits (not shown) such as timing sources, peripherals, voltage regulators, and power management circuits, which are well known in the art, and therefore, will not be described any further.

The communication interface 1502 may be adapted to facilitate wireless communication of the apparatus 1500. For example, the communication interface 1502 may include circuitry and/or programming adapted to facilitate the communication of information bi-directionally with respect to one or more communication devices in a network. In some implementations, the communication interface 1502 may be configured for wire-based communication. In some implementations, the communication interface 1502 may be coupled to one or more antennas 1512 for wireless communication within a wireless communication system. The communication interface 1502 can be configured with one or more standalone receivers and/or transmitters, as well as one or more transceivers. In the illustrated example, the communication interface 1502 includes a transmitter 1514 and a receiver 1516.

The memory device 1508 may represent one or more memory devices. As indicated, the memory device 1508 may maintain schedule-related information 1518 along with other information used by the apparatus 1500. In some implementations, the memory device 1508 and the storage medium 1504 are implemented as a common memory component. The memory device 1508 may also be used for storing data that is manipulated by the processing circuit 1510 or some other component of the apparatus 1500.

The storage medium 1504 may represent one or more computer-readable, machine-readable, and/or processor-readable devices for storing programming, such as processor executable code or instructions (e.g., software, firmware), electronic data, databases, or other digital information. The storage medium 1504 may also be used for storing data that is manipulated by the processing circuit 1510 when executing programming. The storage medium 1504 may be any available media that can be accessed by a general purpose or special purpose processor, including portable or fixed storage devices, optical storage devices, and various other mediums capable of storing, containing or carrying programming.

By way of example and not limitation, the storage medium 1504 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1504 may be embodied in an article of manufacture (e.g., a computer program product). By way of example, a computer program product may include a computer-readable medium in packaging materials. In view of the above, in some implementations, the storage medium 1504 may be a non-transitory (e.g., tangible) storage medium.

The storage medium 1504 may be coupled to the processing circuit 1510 such that the processing circuit 1510 can read information from, and write information to, the storage medium 1504. That is, the storage medium 1504 can be coupled to the processing circuit 1510 so that the storage medium 1504 is at least accessible by the processing circuit 1510, including examples where at least one storage medium is integral to the processing circuit 1510 and/or examples where at least one storage medium is separate from the processing circuit 1510 (e.g., resident in the apparatus 1500, external to the apparatus 1500, distributed across multiple entities, etc.).

Programming stored by the storage medium 1504, when executed by the processing circuit 1510, causes the processing circuit 1510 to perform one or more of the various functions and/or process operations described herein. For example, the storage medium 1504 may include operations configured for regulating operations at one or more hardware blocks of the processing circuit 1510, as well as to utilize the communication interface 1502 for wireless communication utilizing their respective communication protocols.

The processing circuit 1510 is generally adapted for processing, including the execution of such programming stored on the storage medium 1504. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1510 is arranged to obtain, process and/or send data, control data access and storage, issue commands, and control other desired operations. The processing circuit 1510 may include circuitry configured to implement desired programming provided by appropriate media in at least one example. For example, the processing circuit 1510 may be implemented as one or more processors, one or more controllers, and/or other structure configured to execute executable programming. Examples of the processing circuit 1510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1510 are for illustration and other suitable configurations within the scope of the disclosure are also contemplated.

According to one or more aspects of the disclosure, the processing circuit 1510 may be adapted to perform any or all of the features, processes, functions, operations and/or routines for any or all of the apparatuses described herein. For example, the processing circuit 1510 may be configured to perform any of the steps, functions, and/or processes described with respect to FIGS. 1, 8-14, and 16. As used herein, the term "adapted" in relation to the processing circuit 1510 may refer to the processing circuit 1510 being one or more of configured, employed, implemented, and/or programmed to perform a particular process, function, operation and/or routine according to various features described herein.

The processing circuit 1510 may be a specialized processor, such as an application specific integrated circuit (ASIC) that serves as a means for (e.g., structure for) carrying out any one of the operations described in conjunction with FIGS. 1, 8-14, and 16. The processing circuit 1510 may serve as one example of a means for transmitting and/or a means for receiving.

According to at least one example of the apparatus 1500, the processing circuit 1510 may include one or more of a circuit/module for determining an interval 1520, a circuit/module for communicating 1522, a circuit/module for decoding 1524, a circuit/module for determining a length 1526, or a circuit/module for determining a resource block allocation 1528.

The circuit/module for determining an interval 1520 may include circuitry and/or programming (e.g., code for determining an interval 1530 stored on the storage medium 1504) adapted to perform several functions relating to, for example, determining an interval for communicating a scheduling indicator. In various scenarios, the determination of the interval may involve one or more of: defining the interval, receiving the interval (e.g., receiving an indication of the interval from another apparatus or another component), obtaining the interval (e.g., retrieving an indication of the interval from a memory device or some other component), and so on. In some implementations, the circuit/module for determining an interval 1520 determines whether an interval matches a bearer associated with a device (e.g., a UE). For example, for a given UE, the circuit/module for determining an interval 1520 may identify a bearer associated with the UE and then identify the interval (e.g., as shown in FIG. 7) mapped to that bearer. These determinations may be based, for example, on mappings retrieved from the memory device 1508 or obtained in some other manner. The circuit/module for determining an interval 1520 may then output an indication of the interval to a component of the apparatus 1500 (e.g., the memory device 1508 or some other component).

The circuit/module for communicating 1522 may include circuitry and/or programming (e.g., code for communicating 1534 stored on the storage medium 1504) adapted to perform several functions relating to, for example, sending and/or receiving information. In some implementations, the information is a scheduling indicator and the circuit/module for communicating 1522 communicates the scheduling indicator according to an interval (e.g., received from the circuit/module for determining an interval 1520, retrieved from the memory device 1508, or obtained in some other manner). In some implementations, the communication interface 1502 includes the circuit/module for communicating data 1522 and/or the code for communicating 1534.

In some scenarios, the communicating involves the circuit/module for communicating 1522 receiving information directly from a device that transmitted the data or receiving information from a component of the apparatus 1500 (e.g., the receiver 1516, the memory device 1508, or some other component). In this case, the circuit/module for communicating 1522 may process (e.g., decode) the received information. The circuit/module for communicating 1522 then outputs the received information to a component of the apparatus 1500 (e.g., the memory device 1508 or some other component).

In some scenarios, the communicating involves sending information to another component of the apparatus 1500 (e.g., the transmitter 1514) for transmission to another device or sending information directly to an ultimate destination (e.g., if the circuit/module for communicating 1522 includes a transmitter). In this case, the circuit/module for communicating 1522 initially obtains information to be communicated (e.g., from the memory device 1508 or some other component). The circuit/module for communicating 1522 may process (e.g., encode) the information to be transmitted. The circuit/module for communicating 1522 then causes the information to be transmitted. For example, the circuit/module for communicating 1522 can directly transmit the information or pass the information to the transmitter 1514 for subsequent radio frequency (RF) transmission.

In some implementations, the circuit/module for communicating 1522 obtains downlink control information (e.g., from the memory device 1508) and sends the downlink control information to a UE. The sending of this information may be triggered by receipt of an indication from the circuit/module for determining an interval 1520 that indicates that an interval matches a bearer associated with a UE device.

The circuit/module for decoding 1524 may include circuitry and/or programming (e.g., code for decoding 1534 stored on the storage medium 1504) adapted to perform several functions relating to, for example, decoding information. In some implementations, the information is downlink control information (DCI). In some implementations, the information is associated with an on-going grant. The circuit/module for decoding 1524 obtains information to be decoded from a component of the apparatus 1500 (e.g., the memory device 1508 or some other component). The decoding may be conditional. For example, in some implementations, the circuit/module for decoding 1524 decodes downlink control information if a scheduling indicator indicates that a grant may be available (e.g., for a UE). In some implementations, the circuit/module for decoding 1524 temporarily ceases decoding for an on-going grant if a scheduling indicator indicates a higher priority than a priority associated with the grant. In some implementations, the circuit/module for decoding 1524 decodes downlink control information according to an SPI interval associated with a particular device (e.g., a UE). For example, once every SPI interval, the circuit/module for decoding 1524 may attempt to decode downlink control information from a designated channel.

The circuit/module for decoding 1524 may employ different types of decoding. In some implementations, the decoding involves blind decoding on every instance of the DCI. Here, the blind decoding may use hypotheses for dynamic parameters and hypotheses for semi-static parameters. In some implementations, the decoding involves coherent decoding on a subset of the DCI. In this case, the coherent decoding may use hypotheses for semi-static parameters.

The circuit/module for determining a length 1526 may include circuitry and/or programming (e.g., code for determining a length 1536 stored on the storage medium 1504) adapted to perform several functions relating to, for example, determining a length of a bitmap for a scheduling indicator. The circuit/module for determining a length 1526 obtains information about the scheduling indicator (e.g., from the memory device 1508 or some other component of the apparatus 1500). The circuit/module for determining a length 1526 may then determine the length using, for example, the operations described above in conjunction with FIG. 10. The circuit/module for determining a length 1526 may then output an indication of the length to a component of the apparatus 1500 (e.g., the circuit/module for determining a resource block allocation 1528, the memory device 1508, or some other component).

The circuit/module for determining a resource block allocation 1528 may include circuitry and/or programming (e.g., code for determining a resource block allocation 1538 stored on the storage medium 1504) adapted to perform several functions relating to, for example, determining a resource block allocation for a grant.

In some implementations, the circuit/module for determining a resource block allocation 1528 determines the resource block allocation based on the length of a bitmap. In this case, the circuit/module for determining a resource block allocation 1528 obtains an indication of the length of the bitmap (e.g., from the circuit/module for determining a length 1526, the memory device 1508, or some other component of the apparatus 1500). The circuit/module for determining a resource block allocation 1528 may then determine the resource block allocation using, for example, the operations described above in conjunction with FIG. 10. The circuit/module for determining a resource block allocation 1528 may then output an indication of the resource block allocation to a component of the apparatus 1500 (e.g., the memory device 1508 or some other component).

As mentioned above, programming stored by the storage medium 1504, when executed by the processing circuit 1510, causes the processing circuit 1510 to perform one or more of the various functions and/or process operations described herein. For example, the storage medium 1504 may include one or more of the code for determining an interval 1530, the code for communicating 1532, the code for decoding 1534, the code for determining a length 1536, or the code for determining a resource block allocation 1538.

Example Process

Figure 16:
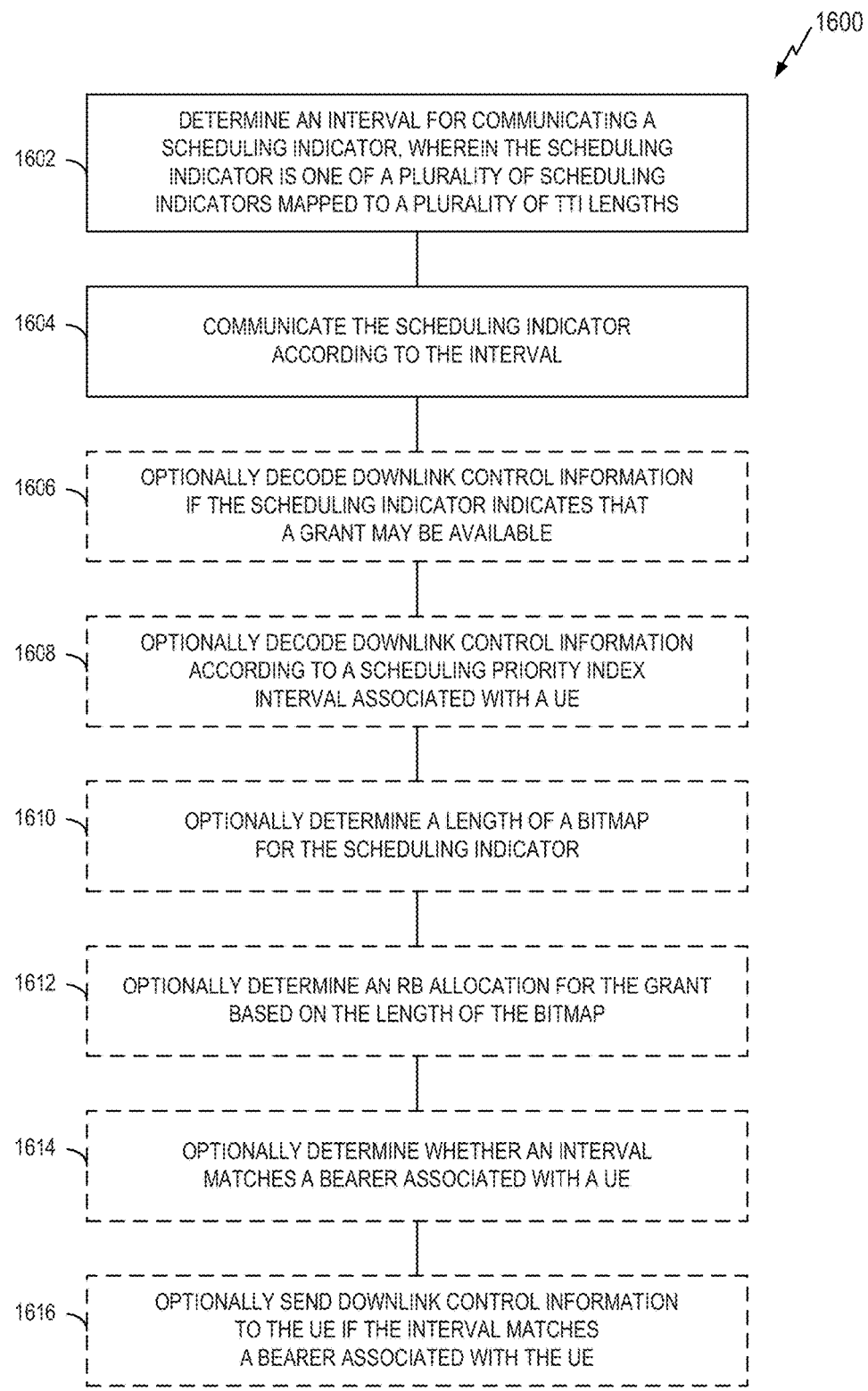
FIG. 16 is a flow diagram illustrating an example of a process for control signaling in accordance with some aspects of the disclosure.

FIG. 16 illustrates a process 1600 for supporting control signaling in accordance with some aspects of the disclosure. The process 1600 may take place within a processing circuit (e.g., the processing circuit 1510 of FIG. 15), which may be located in an access terminal, a base station, or some other suitable apparatus. Of course, in various aspects within the scope of the disclosure, the process 1600 may be implemented by any suitable apparatus capable of supporting control-related operations.

At block 1602, an apparatus (e.g., an access terminal or a base station) determines an interval for communicating a scheduling indicator. Here, the scheduling indicator may be one of a plurality of scheduling indicators mapped to a plurality of transmission time interval (TTI) lengths. In some aspects, the scheduling indicator indicates whether a grant may be available for a user assigned a particular one of the TTI lengths.

In some scenarios, the scheduling indicators are allocated on a per-resource block basis. In some scenarios, the scheduling indicators are allocated on a per-sub-band basis. In some scenarios, the scheduling indicator is communicated on a channel that is common to multiple users. In some scenarios, the scheduling indicator is communicated via beam-forming. In some scenarios, the scheduling indicator is communicated on a channel that is dedicated for a particular user.

At block 1604, the apparatus communicates the scheduling indicator according to the interval. The communicating may involve transmitting and/or receiving, depending, for example, on whether the process 1600 is being performed by a scheduling entity or a subordinate entity.

In some scenarios, the scheduling indicators include a plurality of scheduling priority indicators that indicate corresponding scheduling priorities for the TTI lengths. In some aspects, the communicating of the scheduling indicator may involve receiving the scheduling indicator (e.g., at a UE). In this case, the process 1600 may further include temporarily ceasing decoding for an on-going grant if the scheduling indicator indicates a higher priority than a priority associated with the grant.

At optional block 1606, in some scenarios, the apparatus (e.g., a UE) decodes downlink control information (DCI) if the scheduling indicator indicates that a grant may be available. In some aspects, the DCI may include: dynamic parameters that sometimes vary every TTI; and semi-static parameters that vary only once over multiple TTIs. In some aspects, the decoding may include blind decoding on every instance of the DCI. The blind decoding may use hypotheses for the dynamic parameters and hypotheses for the semi-static parameters. In some aspects, the decoding may include coherent decoding on a subset of the DCI. The coherent decoding may use hypotheses for the semi-static parameters. In some aspects, the DCI may be merged with data for encoding and transmission.

At optional block 1608, in some scenarios, the apparatus decodes downlink control information (DCI) according to an SPI interval associated with a UE. For example, a UE may monitor for downlink control information at times that are based on an SPI interval assigned to the UE.

At optional block 1610, in some scenarios, the apparatus (e.g., a base station) determines a length of a bitmap for the scheduling indicator. At optional block 1612, in some scenarios, the apparatus determines a resource block allocation for the grant based on the length of the bitmap as determined at block 1610. In some aspects, the operations of blocks 1610 and 1612 may correspond to the operations discussed above in conjunction with FIG. 10.

At optional block 1614, in some scenarios, the apparatus determines whether an interval (e.g., the interval of block 1602) matches a bearer associated with a UE. For example, for a given UE, a base station may identify a bearer associated with the UE and then identify the interval (e.g., as shown in FIG. 7) mapped to that bearer. At optional block 1616, in some scenarios, the apparatus sends downlink control information to a UE device if the determination at block 1614 indicates that the interval matches a bearer associated with the UE device. For example, a base station may transmit DCI for a given UE at times that are based on an interval assigned to that UE according to a bearer used by the UE.

In some scenarios, the process 1600 also may include determining another interval for communicating another scheduling indicator and communicating the other scheduling indicator according to the other interval. Here, the other scheduling indicator may indicate whether to stop or start decoding for an active grant.

Example Network

Figure 17:
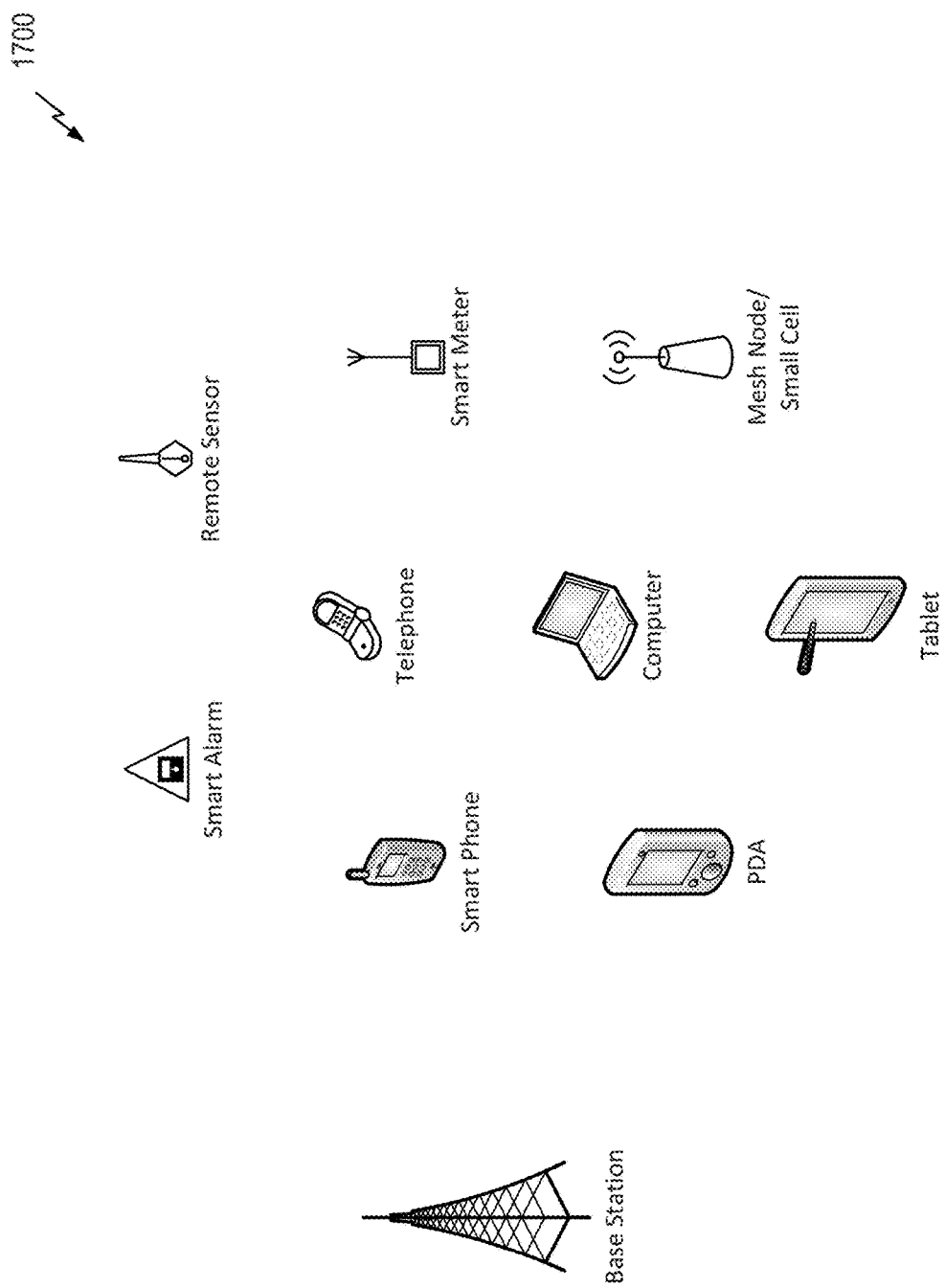
FIG. 17 is a schematic diagram of a wireless communication network within which one or more aspects of the disclosure may be implemented.

FIG. 17 is a schematic illustration of a wireless communication network 1700 including multiple communication entities as it may appear in some aspects of the disclosure. As described herein, a scheduling entity or an entity being scheduled (e.g., as illustrated in FIGS. 3-5) may reside in, or be a part of, a base station, a smart phone, a small cell, or other entity. Subordinate entities or mesh nodes may reside in, or be a part of, a smart alarm, a remote sensor, a smart phone, a telephone, a smart meter, a PDA, a personal computer, a mesh node, and/or a tablet computer. Of course, the illustrated devices or components are merely examples, and any suitable node or device may appear within a wireless communication network within the scope of the present disclosure.

Other Aspects

Of course, these examples are merely provided to illustrate certain concepts of the disclosure. Those of ordinary skill in the art will comprehend that these are merely exemplary in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication, comprising:
receiving an indication of a user priority level;
determining a transmission time interval (TTI) corresponding to the user priority level, the TTI defining an interval for monitoring for a scheduling indicator, wherein the scheduling indicator is one of a plurality of scheduling indicators mapped to a plurality of user priority levels and each scheduling indicator is indicative of whether a grant may be available for a user assigned to a respective one of the plurality of user priority levels; and
monitoring for the scheduling indicator according to the determined interval.

2. The method of claim 1, further comprising:
decoding downlink control information (DCI) if the scheduling indicator indicates that the grant may be available.

3. The method of claim 2, wherein the DCI comprises:
dynamic parameters that vary across multiple TTIs; and
semi-static parameters that vary only once over multiple TTIs.

4. The method of claim 3, wherein:
the decoding comprises blind decoding on every instance of the DCI; and
the blind decoding uses hypotheses for the dynamic parameters and hypotheses for the semi-static parameters.

5. The method of claim 3, wherein:
the decoding comprises coherent decoding on a subset of the DCI; and
the coherent decoding uses hypotheses for the semi-static parameters.

6. The method of claim 2, wherein the DCI is merged with data for encoding and transmission.

7. The method of claim 1, further comprising:
determining another interval for monitoring for another scheduling indicator, wherein the other scheduling indicator indicates whether to stop or start decoding for an on-going grant; and monitoring for the other scheduling indicator according to the other interval.

8. The method of claim 7, further comprising:
receiving the other scheduling indicator; and temporarily ceasing decoding for the on-going grant if the other scheduling indicator indicates a higher priority than a priority associated with the grant.

9. The method of claim 1, further comprising:
receiving the scheduling indicator;
determining a length of a bitmap for the received scheduling indicator; and
determining a resource block allocation for the grant based on the length of the bitmap.

10. The method of claim 1, further comprising:
decoding downlink control information (DCI) according to a scheduling priority index interval associated with a user equipment device.

11. The method of claim 1, wherein the plurality of scheduling indicators are allocated on a per-resource block basis or a per-sub-band basis.

12. The method of claim 1, wherein the scheduling indicator is monitored for on a channel that is common to multiple users.

13. The method of claim 1, wherein the scheduling indicator is monitored for on a channel that is dedicated for a particular user.

14. An apparatus for wireless communication comprising:
a memory device;
a transceiver configured to receive an indication of a user priority level; and
a processing circuit coupled to the memory device and the transceiver, and configured to:
determine a transmission time interval (TTI) corresponding to the user priority level, the TTI defining an interval for monitoring for a scheduling indicator, wherein the scheduling indicator is one of a plurality of scheduling indicators mapped to a plurality of user priority levels and each scheduling indicator is indicative of whether a grant may be available for a user assigned to a respective one of the plurality of user priority levels; and
monitor for the scheduling indicator according to the determined interval.

15. The apparatus of claim 14, wherein the processing circuit is further configured to:
decode downlink control information (DCI) if the scheduling indicator indicates that the grant may be available.

16. The apparatus of claim 14, wherein the processing circuit is further configured to:
determine another interval for monitoring for another scheduling indicator, wherein the other scheduling indicator indicates whether to stop or start decoding for an on-going grant; and
monitor for the other scheduling indicator according to the other interval.

17. The apparatus of claim 16, wherein:
the transceiver is further configured to receive the other scheduling indicator; and
the processing circuit is further configured to temporarily cease decoding for the on-going grant if the other scheduling indicator indicates a higher priority than a priority associated with the grant.

18. The apparatus of claim 14, wherein the processing circuit is further configured to:
receive the scheduling indicator;
determine a length of a bitmap for the received scheduling indicator; and
determine a resource block allocation for the grant based on the length of the bitmap.

19. An apparatus for wireless communication comprising:
means for receiving an indication of a user priority level;
means for determining a transmission time interval (TTI) corresponding to the user priority level, the TTI defining an interval for monitoring for a scheduling indicator, wherein the scheduling indicator is one of a plurality of scheduling indicators mapped to a plurality of user priority levels and each scheduling indicator is indicative of whether a grant may be available for a user assigned to a respective one of the plurality of user priority levels; and
means for monitoring for the scheduling indicator according to the determined interval.

20. The apparatus of claim 19, further comprising:
means for decoding downlink control information (DCI) if the scheduling indicator indicates that the grant may be available.

21. The apparatus of claim 19, further comprising:
means for receiving the scheduling indicator;
means for determining a length of a bitmap for the received scheduling indicator; and
means for determining a resource block allocation for the grant based on the length of the bitmap.

22. A non-transitory computer-readable medium storing computer-executable code for wireless communication including code to:
receive an indication of a user priority level;
determine a transmission time interval (TTI) corresponding to the user priority level, the TTI defining an interval for monitoring for a scheduling indicator, wherein the scheduling indicator is one of a plurality of scheduling indicators mapped to a plurality of user priority levels and each scheduling indicator is indicative of whether a grant may be available for a user assigned to a respective one of the plurality of user priority levels; and
monitor for the scheduling indicator according to the determined interval.

* * * * *